US009512306B2

(12) United States Patent
Peterle et al.

(10) Patent No.: US 9,512,306 B2
(45) Date of Patent: Dec. 6, 2016

(54) MERCAPTOSILANE POLYMER MIXTURE

(71) Applicant: Evonik Degussa GmbH, Essen (DE)

(72) Inventors: Torsten Peterle, Grenzach-Wyhlen (DE); Anke Blume, Weilerswist (DE); Jaroslaw Monkiewicz, Rheinfelden (DE); Andrea Korch, Koln (DE); Juri Tschernjaew, Aschaffenburg (DE); Kathrin Kunowa, Joplin, MO (US); Michael Klose, Frankfurt am Main (DE)

(73) Assignee: EVONIK DEGUSSA GmbH, Essen (DE)

( * ) Notice: Subject to any disclaimer, the term of this patent is extended or adjusted under 35 U.S.C. 154(b) by 0 days.

(21) Appl. No.: 14/759,336

(22) PCT Filed: Feb. 4, 2014

(86) PCT No.: PCT/EP2014/052113
§ 371 (c)(1),
(2) Date: Jul. 6, 2015

(87) PCT Pub. No.: WO2014/135323
PCT Pub. Date: Sep. 12, 2014

(65) Prior Publication Data
US 2015/0353734 A1 Dec. 10, 2015

(30) Foreign Application Priority Data
Mar. 4, 2013 (DE) .................. 10 2013 203 651

(51) Int. Cl.
C08L 9/00 (2006.01)
C08K 5/548 (2006.01)
C08L 21/00 (2006.01)
C08L 23/12 (2006.01)
C08L 23/06 (2006.01)
C08L 31/04 (2006.01)
C08L 23/08 (2006.01)
C08K 3/36 (2006.01)
C08K 5/37 (2006.01)
C08K 5/5415 (2006.01)
B60C 1/00 (2006.01)
C08G 65/336 (2006.01)

(52) U.S. Cl.
CPC . C08L 9/00 (2013.01); B60C 1/00 (2013.01); B60C 1/0016 (2013.04); C08G 65/336 (2013.01); C08K 3/36 (2013.01); C08K 5/37 (2013.01); C08K 5/548 (2013.01); C08K 5/5415 (2013.01); C08L 21/00 (2013.01); C08L 23/06 (2013.01); C08L 23/0853 (2013.01); C08L 23/12 (2013.01); C08L 31/04 (2013.01)

(58) Field of Classification Search
None
See application file for complete search history.

(56) References Cited

U.S. PATENT DOCUMENTS

| 3,453,248 A | 7/1969 | Gowdy et al. |
| 6,410,769 B1 | 6/2002 | Eichenauer et al. |
| 2003/0130535 A1 | 7/2003 | Deschler et al. |
| 2005/0004386 A1 | 1/2005 | Deschler et al. |
| 2006/0161015 A1 | 7/2006 | Klockmann et al. |
| 2008/0319128 A1* | 12/2008 | Korth .................... C07F 7/1892 524/588 |
| 2009/0306267 A1 | 12/2009 | York et al. |
| 2011/0034584 A1 | 2/2011 | Albert et al. |
| 2011/0287205 A1 | 11/2011 | Klockmann et al. |
| 2012/0077902 A1 | 3/2012 | Steiner et al. |
| 2012/0251751 A1 | 10/2012 | Blume et al. |
| 2015/0175782 A1 | 6/2015 | Blume et al. |
| 2015/0218298 A1* | 8/2015 | Sato ..................... B60C 1/0016 525/332.9 |

FOREIGN PATENT DOCUMENTS

| DE | 10 2006 033 310 | 1/2008 |
| DE | 10 2008 010 111 | 9/2009 |
| DE | 10 2009 048 946 | 5/2010 |
| EP | 1 683 801 | 7/2006 |
| EP | 2 433 812 | 3/2012 |
| EP | 2 508 559 | 10/2012 |
| JP | 62-181346 | * 8/1987 |

OTHER PUBLICATIONS

BASF product data sheet delineating the structure of Lutensol TO 5 (no date).*
Bulk Material Density Guide obtained from http://www.hapman.com/resources/bulk-material-density-guide (no date).*
Overview of Materials for Ethylene Vinyl Acetate Copolymer obtained from http://www.matweb.com/search/datasheetTextaspx?bassnum=O4100 (no date).*
International Search Report Issued Nov. 21, 2014 in PCT/EP2014/052113 filed Feb. 4, 2014.
German Search Report Issued Oct. 14, 2013 in German Patent Application No. 10 2013 203 651.5 Filed Mar. 4, 2013 (with English Translation of Categories of Cited Documents).

* cited by examiner

Primary Examiner — Marc Zimmer
(74) Attorney, Agent, or Firm — Oblon, McClelland, Maier & Neustadt, L.L.P.

(57) ABSTRACT

The invention relates to mercaptosilane-polymer blends comprising at least one mercaptosilane of the general formula I

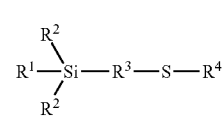

and at least one polymer selected from the group of polypropylene, polyethylene and ethylene-vinyl acetate. They are produced by mixing the mercaptosilane of the general formula I with the polymer.

They can be used in rubber mixtures.

16 Claims, No Drawings

MERCAPTOSILANE POLYMER MIXTURE

The invention relates to a mercaptosilane-polymer blend, a process for production thereof, and also use of said blend.

In the tire industry, sulphur silanes are sometimes used in order, in combination with silica, to improve rolling resistance, wet skid performance and abrasion resistance. The sulphur silanes normally used are liquid, and introduction of these therefore requires that the liquid silane be weighed out in advance to give portions sealed within a film or that liquid is metered directly into the mixer. In order to avoid this complicated mode of addition (most kneaders not having any liquid metering system), the sulphur silanes can be absorbed onto a carrier. The intention is that the carrier does not react with the sulphur silane, in order that the complete amount of silane is available within the tire mixture.

EP 1285926, EP 1683801 and EP 1829922 disclose mercaptosilanes or polysulphidic silanes having polyether groups. The silanes can also have been absorbed on an organic carrier.

Furthermore, KR 850000081 discloses silane/filler blends and DE 102012205642 discloses mercaptosilane/carbon black blends.

U.S. Pat. No. 7,078,551 moreover discloses blocked mercaptosilanes on carrier.

Disadvantageous aspects of the known mercaptosilane/carrier blends are impairment of storage stability, of processability, of reinforcement performance, and of dynamic stiffness and/or dispersibility.

It is an object of the present invention to provide blends of mercaptosilanes with polymers which exhibit good storage stability and processability, good reinforcement performance, and good dynamic stiffness and dispersibility.

The invention provides a mercaptosilane-polymer blend, characterized in that this comprises at least one mercaptosilane of the general formula I

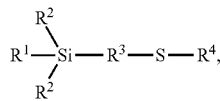

where $R^1$ is an alkyl polyether group $—O—(R^5—O)_m—R^6$, where $R^5$ is identical or different and is a branched or unbranched, saturated or unsaturated, aliphatic divalent C1-C30 hydrocarbon group, preferably $CH_2—CH_2$, $CH_2—CH(CH_3)$, $—CH(CH_3)—CH_2—$ or $CH_2—CH_2—CH_2$, m is on average from 1 to 30, preferably from 2 to 20, particularly preferably from 2 to 15, very particularly preferably from 3 to 10, extremely preferably from 3.5 to 7.9, and $R^6$ is composed of at least 1, preferably at least 11, particularly preferably at least 12, C atoms and is an unsubstituted or substituted, branched or unbranched monovalent alkyl, alkenyl, aryl or aralkyl group, $R^2$ is identical or different and is an $R^1$, C1-C12-alkyl or $R^7O$ group, where $R^7$ is H, methyl, ethyl, propyl, C9-C30 branched or unbranched monovalent alkyl, alkenyl, aryl, or aralkyl group or $(R^6)_3Si$ group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30, preferably C1-C6, particularly preferably C3, hydrocarbon group and $R^4$ is H, CN or $(C=O)—R^9$, where $R^9$ is a branched or unbranched, saturated or unsaturated, aliphatic, aromatic or mixed aliphatic/aromatic monovalent C1-C30, preferably C5 to C30, particularly preferably C5 to C20, very particularly preferably C7 to C15, extremely preferably C7 to C11, hydrocarbon group, and at least one polymer selected from the group of polypropylene, polyethylene, preferably HDPE, ethylene-vinyl acetate and mixtures of the abovementioned polymers.

The mercaptosilane-polymer blend can comprise at least 20% by weight, preferably at least 25% by weight, particularly preferably from 30% to 70% by weight, of mercaptosilane of the general formula I, based on the mercaptosilane-polymer blend.

The ratio by weight of mercaptosilane of the general formula I to polymer can be from 30:70 to 60:40, preferably from 40:60 to 50:50.

The molar mass of the polymer can be from 50 000-1 000 000 g/mol, preferably from 80 000 to 500 000 g/mol, particularly preferably from 100 000 to 250 000 g/mol (DIN EN ISO 16014-5: plastics—Determination of average molecular mass and molecular mass distribution of polymers using size-exclusion chromatography—Part 5: Method using light-scattering detection).

The melting point of the polymer can be from 80 to 200° C., preferably from 90 to 180° C. (Differential Scanning calorimetry—DSC Determination method, DIN EN ISO 11357). Very particularly preferred melting points can be: ethylene-vinyl acetate from 90 to 120° C., polyethylene from 105 to 140° C. and polypropylene from 140 to 175° C.

The bulk density of the polymer can be from 80 to 150 kg/m³, preferably from 90 to 140 kg/m³ (DIN EN ISO 60).

The melt volume flow rate (MFR) of the polymer can be from 0.2 to 30 g/10 min (ISO 1133: 190° C./2.16 kg). Particularly preferred melt volume flow rates can be: ethylene-vinyl acetate from 0.4 to 1.0 g/10 min, polyethylene from 1.0 to 5.0 g/10 min and polypropylene from 20 to 30 g/10 min.

The glass transition temperature of the polymer can be from −80 to +10° C. (ISO 1133). Particularly preferred glass transition temperatures can be: ethylene-vinyl acetate −30 to −10° C., polyethylene from −80 to −60° C. and polypropylene from −30 to +10° C.

The polyethylene polymer can be an HDPE. The density of the HDPE can be from 0.94 to 0.97 g/cm³.

The bulk density of the mercaptosilane-polymer blend can be from 80 to 900 kg/m³ (DIN EN ISO 60).

The polymer ethylene-vinyl acetate is a copolymer of vinyl acetate and ethylene and can comprise from 4 to 30% by weight, preferably from 4.3 to 6.7% by weight, of vinyl acetate (DIN EN ISO 4613-2: Plastics—Ethylene-vinyl acetate (E/VAC) moulding and extrusion materials—Part 2: Preparation of test specimens and determination of properties).

The mercaptosilanes of the general formula I can be compounds where $R^1$ is an alkyl polyether group $—O—(R^5—O)_m—R^6$, where $R^5$ is identical or different and is a branched or unbranched, saturated or unsaturated, aliphatic divalent C1-C30 hydrocarbon group, m is on average from 1 to 30, and $R^6$ is composed of at least 11 C atoms and is an unsubstituted or substituted, branched or unbranched monovalent alkyl, alkenyl, aryl or aralkyl group, $R^2$ is identical and is a C1-C12-alkyl or $R^7O$ group, where $R^7$ is H, ethyl, propyl, C9-C30 branched or unbranched monovalent alkyl, alkenyl, aryl, or aralkyl group or $(R^8)_3Si$ group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30 hydrocarbon group and $R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group.

The mercaptosilanes of the general formula I can be compounds where $R^1$ is

—O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, —O—$(C_2H_4$—O$)_7$—$C_{13}H_{27}$, —O—$(CH_2CH_2$—O$)_5$—$(CH_2)_{10}CH_3$, —O—$(CH_2CH_2$—O$)_5$—$(CH_2)_{11}CH_3$, —O—$(CH_2CH_2$—O$)_5$—$(CH_2)_{12}CH_3$, —O—$(CH_2CH_2$—O$)_5$—$(CH_2)_{13}CH_3$, —O—$(CH_2CH_2$—O$)_5$—$(CH_2)_{14}CH_3$, —O—$(CH_2CH_2$—O$)_3$—$(CH_2)_{12}CH_3$, —O—$(CH_2CH_2$—O$)_4$—$(CH_2)_{12}CH_3$, —O—$(CH_2CH_2$—O$)_6$—$(CH_2)_{12}CH_3$, —O—$(CH_2CH_2$—O$)_7$—$(CH_2)_{12}CH_3$,

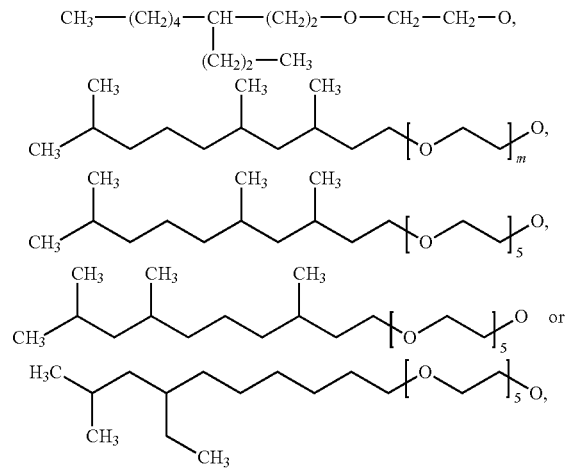

$R^2$ is different and is an $R^1$, C1-C12-alkyl or $R^7O$ group, where $R^7$ is H, methyl, ethyl, propyl, C9-C30 branched or unbranched monovalent alkyl, alkenyl, aryl, or aralkyl group or $(R^8)_3$Si group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30 hydrocarbon group and $R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group.

The mercaptosilanes of the general formula I can be compounds where $R^1$ is

—O—$(C_2H_4$—O$)_5$—$C_{11}H_{23}$, —O—$(C_2H_4$—O$)_5$—$C_{12}H_{25}$, —O—$(C_2H_4$—O$)_5$—$C_{13}H_{27}$, —O—$(C_2H_4$—O$)_5$—$C_{14}H_{29}$, —O—$(C_2H_4$—O$)_5$—$C_{15}H_{31}$, —O—$(C_2H_4$—O$)_3$—$C_{13}H_{27}$, —O—$(C_2H_4$—O$)_4$—$C_{13}H_{27}$, —O—$(C_2H_4$—O$)_6$—$C_{13}H_{27}$, —O—$(C_2H_4$—O$)_7$—$C_{13}H_7$, —O—$(CH_2CH_2$—O$)_5$—$(CH_2)_{10}CH_3$, —O—$(CH_2CH_2$—O$)_5$—$(CH_2)_{11}CH_3$, —O—$(CH_2CH_2$—O$)_5$—$(CH_2)_{12}CH_3$, —O—$(CH_2CH_2$—O$)_5$—$(CH_2)_{13}CH_3$, —O—$(CH_2CH_2$—O$)_5$—$(CH_2)_{14}CH_3$, —O—$(CH_2CH_2$—O$)_3$—$(CH_2)_{12}CH_3$, —O—$(CH_2CH_2$—O$)_4$—$(CH_2)_{12}CH_3$, —O—$(CH_2CH_2$—O$)_6$—$(CH_2)_{12}CH_3$, —O—$(CH_2CH_2$—O$)_7$—$(CH_2)_{12}CH_3$,

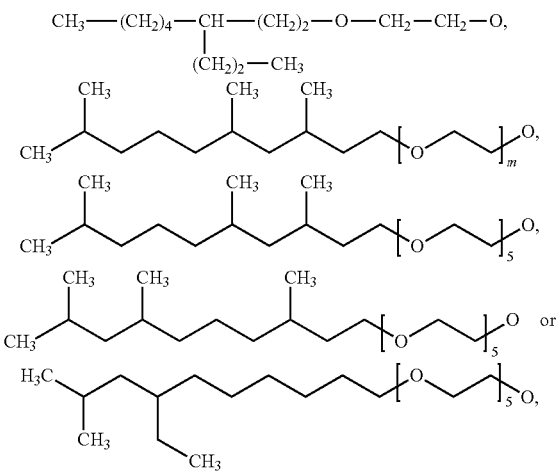

$R^2$ is $R^1$ group, $R^3$ is a branched or unbranched, saturate or unsaturated, aliphatic, aromatic or mixed aliphatic/aromatic divalent C1-C30 hydrocarbon group and $R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group.

Preferred compounds of the formula I where $R^4$=H can be:

$[(C_{11}H_{23}O$—$(CH_2$—$CH_2O)_2](EtO)_2Si(CH_2)_3SH$,
$[(C_{11}H_{23}O$—$(CH_2$—$CH_2O)_3](EtO)_2Si(CH_2)_3SH$,
$[(C_{11}H_{23}O$—$(CH_2$—$CH_2O)_4](EtO)_2Si(CH_2)_3SH$,
$[(C_{11}H_{23}O$—$(CH_2$—$CH_2O)_5](EtO)_2Si(CH_2)_3SH$,
$[(C_{11}H_{23}O$—$(CH_2$—$CH_2O)_6](EtO)_2Si(CH_2)_3SH$,
$[(C_{12}H_{25}O$—$(CH_2$—$CH_2O)_2](EtO)_2Si(CH_2)_3SH$,
$[(C_{12}H_{25}O$—$(CH_2$—$CH_2O)_3](EtO)_2Si(CH_2)_3SH$,
$[(C_{12}H_{25}O$—$(CH_2$—$CH_2O)_4](EtO)_2Si(CH_2)_3SH$,
$[(C_{12}H_{25}O$—$(CH_2$—$CH_2O)_5](EtO)_2Si(CH_2)_3SH$,
$[(C_{12}H_{25}O$—$(CH_2$—$CH_2O)_6](EtO)_2Si(CH_2)_3SH$,
$[(C_{13}H_{27}O$—$(CH_2$—$CH_2O)_2](EtO)_2Si(CH_2)_3SH$,
$[(C_{13}H_{27}O$—$(CH_2$—$CH_2O)_3](EtO)_2Si(CH_2)_3SH$,
$[(C_{13}H_{27}O$—$(CH_2$—$CH_2O)_4](EtO)_2Si(CH_2)_3SH$,
$[(C_{13}H_{27}O$—$(CH_2$—$CH_2O)_5](EtO)_2Si(CH_2)_3SH$,
$[(C_{13}H_{27}O$—$(CH_2$—$CH_2O)_6](EtO)_2Si(CH_2)_3SH$,
$[(C_{14}H_{29}O$—$(CH_2$—$CH_2O)_2](EtO)_2Si(CH_2)_3SH$,
$[(C_{14}H_{29}O$—$(CH_2$—$CH_2O)_3](EtO)_2Si(CH_2)_3SH$,
$[(C_{14}H_{29}O$—$(CH_2$—$CH_2O)_4](EtO)_2Si(CH_2)_3SH$,
$[(C_{14}H_{29}O$—$(CH_2$—$CH_2O)_5](EtO)_2Si(CH_2)_3SH$,
$[(C_{14}H_{29}O$—$(CH_2$—$CH_2O)_6](EtO)_2Si(CH_2)_3SH$,
$[(C_{15}H_{31}O$—$(CH_2$—$CH_2O)_2](EtO)_2Si(CH_2)_3SH$,
$[(C_{15}H_{31}O$—$(CH_2$—$CH_2O)_3](EtO)_2Si(CH_2)_3SH$,
$[(C_{15}H_{31}O$—$(CH_2$—$CH_2O)_4](EtO)_2Si(CH_2)_3SH$,
$[(C_{15}H_{31}O$—$(CH_2$—$CH_2O)_5](EtO)_2Si(CH_2)_3SH$,
$[(C_{15}H_{31}O$—$(CH_2$—$CH_2O)_6](EtO)_2Si(CH_2)_3SH$,
$[(C_{16}H_{33}O$—$(CH_2$—$CH_2O)_2](EtO)_2Si(CH_2)_3SH$,
$[(C_{16}H_{33}O$—$(CH_2$—$CH_2O)_3](EtO)_2Si(CH_2)_3SH$,
$[(C_{16}H_{33}O$—$(CH_2$—$CH_2O)_4](EtO)_2Si(CH_2)_3SH$,
$[(C_{16}H_{33}O$—$(CH_2$—$CH_2O)_5](EtO)_2Si(CH_2)_3SH$,
$[(C_{16}H_{33}O$—$(CH_2$—$CH_2O)_6](EtO)_2Si(CH_2)_3SH$,
$[(C_{17}H_{35}O$—$(CH_2$—$CH_2O)_2](EtO)_2Si(CH_2)_3SH$,
$[(C_{17}H_{35}O$—$(CH_2$—$CH_2O)_3](EtO)_2Si(CH_2)_3SH$,
$[(C_{17}H_{35}O$—$(CH_2$—$CH_2O)_4](EtO)_2Si(CH_2)_3SH$,
$[(C_{17}H_{35}O$—$(CH_2$—$CH_2O)_5](EtO)_2Si(CH_2)_3SH$,
$[(C_{17}H_{35}O$—$(CH_2$—$CH_2O)_6](EtO)_2Si(CH_2)_3SH$,
$[(C_{11}H_{23}O$—$(CH_2$—$CH_2O)_2]_2(EtO)Si(CH_2)_3SH$,
$[(C_{11}H_{23}O$—$(CH_2$—$CH_2O)_3]_2(EtO)Si(CH_2)_3SH$,

[(C_{11}H_{23}O—(CH_2—CH_2O)_4]_2(EtO)Si(CH_2)_3SH,
[(C_{11}H_{23}O—(CH_2—CH_2O)_5]_2(EtO)Si(CH_2)_3SH,
[(C_{11}H_{23}O—(CH_2—CH_2O)_6]_2(EtO)Si(CH_2)_3SH,
[(C_{12}H_{25}O—(CH_2—CH_2O)_2]_2(EtO)Si(CH_2)_3SH,
[(C_{12}H_{25}O—(CH_2—CH_2O)_3]_2(EtO)Si(CH_2)_3SH,
[(C_{12}H_{25}O—(CH_2—CH_2O)_4]_2(EtO)Si(CH_2)_3SH,
[(C_{12}H_{25}O—(CH_2—CH_2O)_5]_2(EtO)Si(CH_2)_3SH,
[(C_{12}H_{25}O—(CH_2—CH_2O)_6]_2(EtO)Si(CH_2)_3SH,
[(C_{13}H_{27}O—(CH_2—CH_2O)_2]_2(EtO)Si(CH_2)_3SH,
[(C_{13}H_{27}O—(CH_2—CH_2O)_3]_2(EtO)Si(CH_2)_3SH,
[(C_{13}H_{27}O—(CH_2—CH_2O)_4]_2(EtO)Si(CH_2)_3SH,
[(C_{13}H_{27}O—(CH_2—CH_2O)_5]_2(EtO)Si(CH_2)_3SH,
[(C_{13}H_{27}O—(CH_2—CH_2O)_6]_2(EtO)Si(CH_2)_3SH,
[(C_{14}H_{29}O—(CH_2—CH_2O)_2]_2(EtO)Si(CH_2)_3SH,
[(C_{14}H_{29}O—(CH_2—CH_2O)_3]_2(EtO)Si(CH_2)_3SH,
[(C_{14}H_{29}O—(CH_2—CH_2O)_4]_2(EtO)Si(CH_2)_3SH,
[(C_{14}H_{29}O—(CH_2—CH_2O)_5]_2(EtO)Si(CH_2)_3SH,
[(C_{14}H_{29}O—(CH_2—CH_2O)_4]_2(EtO)Si(CH_2)_3SH,
[(C_{15}H_{31}O—(CH_2—CH_2O)_2]_2(EtO)Si(CH_2)_3SH,
[(C_{15}H_{31}O—(CH_2—CH_2O)_3]_2(EtO)Si(CH_2)_3SH,
[(C_{15}H_{31}O—(CH_2—CH_2O)_4]_2(EtO)Si(CH_2)_3SH,
[(C_{15}H_{31}O—(CH_2—CH_2O)_5]_2(EtO)Si(CH_2)_3SH,
[(C_{15}H_{31}O—(CH_2—CH_2O)_4]_2(EtO)Si(CH_2)_3SH,
[(C_{16}H_{33}O—(CH_2—CH_2O)_2]_2(EtO)Si(CH_2)_3SH,
[(C_{16}H_{33}O—(CH_2—CH_2O)_3]_2(EtO)Si(CH_2)_3SH,
[(C_{16}H_{33}O—(CH_2—CH_2O)_4]_2(EtO)Si(CH_2)_3SH,
[(C_{16}H_{33}O—(CH_2—CH_2O)_5]_2(EtO)Si(CH_2)_3SH,
[(C_{16}H_{33}O—(CH_2—CH_2O)_6]_2(EtO)Si(CH_2)_3SH,
[(C_{17}H_{35}O—(CH_2—CH_2O)_2]_2(EtO)Si(CH_2)_3SH,
[(C_{17}H_{35}O—(CH_2—CH_2O)_3]_2(EtO)Si(CH_2)_3SH,
[(C_{17}H_{35}O—(CH_2—CH_2O)_4]_2(EtO)Si(CH_2)_3SH,
[(C_{17}H_{35}O—(CH_2—CH_2O)_5]_2(EtO)Si(CH_2)_3SH,
[(C_{17}H_{35}O—(CH_2—CH_2O)_6]_2(EtO)Si(CH_2)_3SH,
[(C_{11}H_{23}O—(CH_2—CH_2O)_2]_3Si(CH_2)_3SH,
[(C_{11}H_{23}O—(CH_2—CH_2O)_3]_3Si(CH_2)_3SH,
[(C_{11}H_{23}O—(CH_2—CH_2O)_4]_3Si(CH_2)_3SH,
[(C_{11}H_{23}O—(CH_2—CH_2O)_5]_3Si(CH_2)_3SH,
[(C_{11}H_{23}O—(CH_2—CH_2O)_6]_3Si(CH_2)_3SH,
[(C_{12}H_{25}O—(CH_2—CH_2O)_2]_3Si(CH_2)_3SH,
[(C_{12}H_{25}O—(CH_2—CH_2O)_3]_3Si(CH_2)_3SH,
[(C_{12}H_{25}O—(CH_2—CH_2O)_4]_3Si(CH_2)_3SH,
[(C_{12}H_{25}O—(CH_2—CH_2O)_5]_3Si(CH_2)_3SH,
[(C_{12}H_{25}O—(CH_2—CH_2O)_6]_3Si(CH_2)_3SH,
[(C_{13}H_{27}O—(CH_2—CH_2O)_2]_3Si(CH_2)_3SH,
[(C_{13}H_{27}O—(CH_2—CH_2O)_3]_3Si(CH_2)_3SH,
[(C_{13}H_{27}O—(CH_2—CH_2O)_4]_3Si(CH_2)_3SH,
[(C_{13}H_{27}O—(CH_2—CH_2O)_5]_3Si(CH_2)_3SH,
[(C_{13}H_{27}O—(CH_2—CH_2O)_6]_3Si(CH_2)_3SH,
[(C_{14}H_{29}O—(CH_2—CH_2O)_2]_3Si(CH_2)_3SH,
[(C_{14}H_{29}O—(CH_2—CH_2O)_3]_3Si(CH_2)_3SH,
[(C_{14}H_{29}O—(CH_2—CH_2O)_4]_3Si(CH_2)_3SH,
[(C_{14}H_{29}O—(CH_2—CH_2O)_5]_3Si(CH_2)_3SH,
[(C_{14}H_{29}O—(CH_2—CH_2O)_6]_3Si(CH_2)_3SH,
[(C_{15}H_{31}O—(CH_2—CH_2O)_2]_3Si(CH_2)_3SH,
[(C_{15}H_{31}O—(CH_2—CH_2O)_3]_3Si(CH_2)_3SH,
[(C_{15}H_{31}O—(CH_2—CH_2O)_4]_3Si(CH_2)_3SH,
[(C_{15}H_{31}O—(CH_2—CH_2O)_5]_3Si(CH_2)_3SH,
[(C_{15}H_{31}O—(CH_2—CH_2O)_6]_3Si(CH_2)_3SH,
[(C_{16}H_{33}O—(CH_2—CH_2O)_2]_3Si(CH_2)_3SH,
[(C_{16}H_{33}O—(CH_2—CH_2O)_3]_3Si(CH_2)_3SH,
[(C_{16}H_{33}O—(CH_2—CH_2O)_4]_3Si(CH_2)_3SH,
[(C_{16}H_{33}O—(CH_2—CH_2O)_5]_3Si(CH_2)_3SH,
[(C_{16}H_{33}O—(CH_2—CH_2O)_6]_3Si(CH_2)_3SH,
[(C_{17}H_{35}O—(CH_2—CH_2O)_2]_3Si(CH_2)_3SH,
[(C_{17}H_{35}O—(CH_2—CH_2O)_3]_3Si(CH_2)_3SH,
[(C_{17}H_{35}O—(CH_2—CH_2O)_4]_3Si(CH_2)_3SH,
[(C_{17}H_{35}O—(CH_2—CH_2O)_5]_3Si(CH_2)_3SH,
[(C_{17}H_{35}O—(CH_2—CH_2O)_6]_3Si(CH_2)_3SH,
[(C_{11}H_{23}O—(CH_2—CH_2O)_2](EtO)_2Si—CH_2—CH(CH_3)—CH_2—SH,
[(C_{11}H_{23}O—(CH_2—CH_2O)_3](EtO)_2Si—CH_2—CH(CH_3)—CH_2—SH,
[(C_{11}H_{23}O—(CH_2—CH_2O)_4](EtO)_2Si—CH_2—CH(CH_3)—CH_2—SH,
[(C_{11}H_{23}O—(CH_2—CH_2O)_5](EtO)_2Si—CH_2—CH(CH_3)—CH_2—SH,
[(C_{11}H_{23}O—(CH_2—CH_2O)_6](EtO)_2Si—CH_2—CH(CH_3)—CH_2—SH,
[(C_{12}H_{25}O—(CH_2—CH_2O)_2](EtO)_2Si—CH_2—CH(CH_3)—CH_2—SH,
[(C_{12}H_{25}O—(CH_2—CH_2O)_3](EtO)_2Si—CH_2—CH(CH_3)—CH_2—SH,
[(C_{12}H_{25}O—(CH_2—CH_2O)_4](EtO)_2Si—CH_2—CH(CH_3)—CH_2—SH,
[(C_{12}H_{25}O—(CH_2—CH_2O)_5](EtO)_2Si—CH_2—CH(CH_3)—CH_2—SH,
[(C_{12}H_{25}O—(CH_2—CH_2O)_6](EtO)_2Si—CH_2—CH(CH_3)—CH_2—SH,
[(C_{13}H_{27}O—(CH_2—CH_2O)_2](EtO)_2Si—CH_2—CH(CH_3)—CH_2—SH,
[(C_{13}H_{27}O—(CH_2—CH_2O)_3](EtO)_2Si—CH_2—CH(CH_3)—CH_2—SH,
[(C_{13}H_{27}O—(CH_2—CH_2O)_4](EtO)_2Si—CH_2—CH(CH_3)—CH_2—SH,
[(C_{13}H_{27}O—(CH_2—CH_2O)_5](EtO)_2Si—CH_2—CH(CH_3)—CH_2—SH,
[(C_{13}H_{27}O—(CH_2—CH_2O)_6](EtO)_2Si—CH_2—CH(CH_3)—CH_2—SH,
[(C_{14}H_{29}O—(CH_2—CH_2O)_2](EtO)_2Si—CH_2—CH(CH_3)—CH_2—SH,
[(C_{14}H_{29}O—(CH_2—CH_2O)_3](EtO)_2Si—CH_2—CH(CH_3)—CH_2—SH,
[(C_{14}H_{29}O—(CH_2—CH_2O)_4](EtO)_2Si—CH_2—CH(CH_3)—CH_2—SH,
[(C_{14}H_{29}O—(CH_2—CH_2O)_5](EtO)_2Si—CH_2—CH(CH_3)—CH_2—SH,
[(C_{14}H_{29}O—(CH_2—CH_2O)_6](EtO)_2Si—CH_2—CH(CH_3)—CH_2—SH,
[(C_{15}H_{31}O—(CH_2—CH_2O)_2](EtO)_2Si—CH_2—CH(CH_3)—CH_2—SH,
[(C_{15}H_{31}O—(CH_2—CH_2O)_3](EtO)_2Si—CH_2—CH(CH_3)—CH_2—SH,
[(C_{15}H_{31}O—(CH_2—CH_2O)_4](EtO)_2Si—CH_2—CH(CH_3)—CH_2—SH,
[(C_{15}H_{31}O—(CH_2—CH_2O)_5](EtO)_2Si—CH_2—CH(CH_3)—CH_2—SH,
[(C_{15}H_{31}O—(CH_2—CH_2O)_6](EtO)_2Si—CH_2—CH(CH_3)—CH_2—SH,
[(C_{16}H_{33}O—(CH_2—CH_2O)_2](EtO)_2Si—CH_2—CH(CH_3)—CH_2—SH,
[(C_{16}H_{33}O—(CH_2—CH_2O)_3](EtO)_2Si—CH_2—CH(CH_3)—CH_2—SH,
[(C_{16}H_{33}O—(CH_2—CH_2O)_4](EtO)_2Si—CH_2—CH(CH_3)—CH_2—SH,
[(C_{16}H_{33}O—(CH_2—CH_2O)_5](EtO)_2Si—CH_2—CH(CH_3)—CH_2—SH,
[(C_{16}H_{33}O—(CH_2—CH_2O)_6](EtO)_2Si—CH_2—CH(CH_3)—CH_2—SH,
[(C_{17}H_{35}O—(CH_2—CH_2O)_2](EtO)_2Si—CH_2—CH(CH_3)—CH_2—SH,
[(C_{17}H_{35}O—(CH_2—CH_2O)_3](EtO)_2Si—CH_2—CH(CH_3)—CH_2—SH,
[(C_{17}H_{35}O—(CH_2—CH_2O)_4](EtO)_2Si—CH_2—CH(CH_3)—CH_2—SH,

[(C$_{17}$H$_{35}$O—(CH$_2$—CH$_2$O)$_5$](EtO)$_2$Si—CH$_2$—CH(CH$_3$)—CH$_2$—SH,
[(C$_{17}$H$_{35}$O—(CH$_2$—CH$_2$O)$_6$](EtO)$_2$Si—CH$_2$—CH(CH$_3$)—CH$_2$—SH,
[(C$_{11}$H$_{23}$O—(CH$_2$—CH$_2$O)$_2$]$_2$(EtO)Si—CH$_2$—CH(CH$_3$)—CH$_2$—SH,
[(C$_{11}$H$_{23}$O—(CH$_2$—CH$_2$O)$_3$]$_2$(EtO)Si—CH$_2$—CH(CH$_3$)—CH$_2$—SH,
[(C$_{11}$H$_{23}$O—(CH$_2$—CH$_2$O)$_4$]$_2$(EtO)Si—CH$_2$—CH(CH$_3$)—CH$_2$—SH,
[(C$_{11}$H$_{23}$O—(CH$_2$—CH$_2$O)$_5$]$_2$(EtO)Si—CH$_2$—CH(CH$_3$)—CH$_2$—SH,
[(C$_{11}$H$_{23}$O—(CH$_2$—CH$_2$O)$_6$]$_2$(EtO)Si—CH$_2$—CH(CH$_3$)—CH$_2$—SH,
[(C$_{12}$H$_{25}$O—(CH$_2$—CH$_2$O)$_2$]$_2$(EtO)Si—CH$_2$—CH(CH$_3$)—CH$_2$—SH,
[(C$_{12}$H$_{25}$O—(CH$_2$—CH$_2$O)$_3$]$_2$(EtO)Si—CH$_2$—CH(CH$_3$)—CH$_2$—SH,
[(C$_{12}$H$_{25}$O—(CH$_2$—CH$_2$O)$_4$]$_2$(EtO)Si—CH$_2$—CH(CH$_3$)—CH$_2$—SH,
[(C$_{12}$H$_{25}$O—(CH$_2$—CH$_2$O)$_5$]$_2$(EtO)Si—CH$_2$—CH(CH$_3$)—CH$_2$—SH,
[(C$_{12}$H$_{25}$O—(CH$_2$—CH$_2$O)$_6$]$_2$(EtO)Si—CH$_2$—CH(CH$_3$)—CH$_2$—SH,
[(C$_{13}$H$_{23}$O—(CH$_2$—CH$_2$O)$_2$]$_2$(EtO)Si—CH$_2$—CH(CH$_3$)—CH$_2$—SH,
[(C$_{13}$H$_{27}$O—(CH$_2$—CH$_2$O)$_3$]$_2$(EtO)Si—CH$_2$—CH(CH$_3$)—CH$_2$—SH,
[(C$_{13}$H$_{27}$O—(CH$_2$—CH$_2$O)$_4$]$_2$(EtO)Si—CH$_2$—CH(CH$_3$)—CH$_2$—SH,
[(C$_{13}$H$_{27}$O—(CH$_2$—CH$_2$O)$_5$]$_2$(EtO)Si—CH$_2$—CH(CH$_3$)—CH$_2$—SH,
[(C$_{13}$H$_{27}$O—(CH$_2$—CH$_2$O)$_6$]$_2$(EtO)Si—CH$_2$—CH(CH$_3$)—CH$_2$—SH,
[(C$_{14}$H$_{29}$O—(CH$_2$—CH$_2$O)$_2$]$_2$(EtO)Si—CH$_2$—CH(CH$_3$)—CH$_2$—SH,
[(C$_{14}$H$_{29}$O—(CH$_2$—CH$_2$O)$_3$]$_2$(EtO)Si—CH$_2$—CH(CH$_3$)—CH$_2$—SH,
[(C$_{14}$H$_{29}$O—(CH$_2$—CH$_2$O)$_4$]$_2$(EtO)Si—CH$_2$—CH(CH$_3$)—CH$_2$—SH,
[(C$_{14}$H$_{29}$O—(CH$_2$—CH$_2$O)$_5$]$_2$(EtO)Si—CH$_2$—CH(CH$_3$)—CH$_2$—SH,
[(C$_{14}$H$_{29}$O—(CH$_2$—CH$_2$O)$_6$]$_2$(EtO)Si—CH$_2$—CH(CH$_3$)—CH$_2$—SH,
[(C$_{15}$H$_{31}$O—(CH$_2$—CH$_2$O)$_2$]$_2$(EtO)Si—CH$_2$—CH(CH$_3$)—CH$_2$—SH,
[(C$_{15}$H$_{31}$O—(CH$_2$—CH$_2$O)$_3$]$_2$(EtO)Si—CH$_2$—CH(CH$_3$)—CH$_2$—SH,
[(C$_{15}$H$_{31}$O—(CH$_2$—CH$_2$O)$_4$]$_2$(EtO)Si—CH$_2$—CH(CH$_3$)—CH$_2$—SH,
[(C$_{15}$H$_{31}$O—(CH$_2$—CH$_2$O)$_5$]$_2$(EtO)Si—CH$_2$—CH(CH$_3$)—CH$_2$—SH,
[(C$_{15}$H$_{31}$O—(CH$_2$—CH$_2$O)$_6$]$_2$(EtO)Si—CH$_2$—CH(CH$_3$)—CH$_2$—SH,
[(C$_{16}$H$_{33}$O—(CH$_2$—CH$_2$O)$_2$]$_2$(EtO)Si—CH$_2$—CH(CH$_3$)—CH$_2$—SH,
[(C$_{16}$H$_{33}$O—(CH$_2$—CH$_2$O)$_3$]$_2$(EtO)Si—CH$_2$—CH(CH$_3$)—CH$_2$—SH,
[(C$_{16}$H$_{33}$O—(CH$_2$—CH$_2$O)$_4$]$_2$(EtO)Si—CH$_2$—CH(CH$_3$)—CH$_2$—SH,
[(C$_{16}$H$_{33}$O—(CH$_2$—CH$_2$O)$_5$]$_2$(EtO)Si—CH$_2$—CH(CH$_3$)—CH$_2$—SH,
[(C$_{16}$H$_{33}$O—(CH$_2$—CH$_2$O)$_6$]$_2$(EtO)Si—CH$_2$—CH(CH$_3$)—CH$_2$—SH,
[(C$_{17}$H$_{35}$O—(CH$_2$—CH$_2$O)$_2$]$_2$(EtO)Si—CH$_2$—CH(CH$_3$)—CH$_2$—SH,
[(C$_{17}$H$_{35}$O—(CH$_2$—CH$_2$O)$_3$]$_2$(EtO)Si—CH$_2$—CH(CH$_3$)—CH$_2$—SH,
[(C$_{17}$H$_{35}$O—(CH$_2$—CH$_2$O)$_4$]$_2$(EtO)Si—CH$_2$—CH(CH$_3$)—CH$_2$—SH,
[(C$_{17}$H$_{35}$O—(CH$_2$—CH$_2$O)$_5$]$_2$(EtO)Si—CH$_2$—CH(CH$_3$)—CH$_2$—SH,
[(C$_{17}$H$_{35}$O—(CH$_2$—CH$_2$O)$_6$]$_2$(EtO)Si—CH$_2$—CH(CH$_3$)—CH$_2$—SH,
[(C$_{11}$H$_{23}$O—(CH$_2$—CH$_2$O)$_2$]$_3$Si—CH$_2$—CH(CH$_3$)—CH$_2$—SH,
[(C$_{11}$H$_{23}$O—(CH$_2$—CH$_2$O)$_3$]$_3$Si—CH$_2$—CH(CH$_3$)—CH$_2$—SH,
[(C$_{11}$H$_{23}$O—(CH$_2$—CH$_2$O)$_4$]$_3$Si—CH$_2$—CH(CH$_3$)—CH$_2$—SH,
[(C$_{11}$H$_{23}$O—(CH$_2$—CH$_2$O)$_5$]$_3$Si—CH$_2$—CH(CH$_3$)—CH$_2$—SH,
[(C$_{11}$H$_{23}$O—(CH$_2$—CH$_2$O)$_6$]$_3$Si—CH$_2$—CH(CH$_3$)—CH$_2$—SH,
[(C$_{12}$H$_{25}$O—(CH$_2$—CH$_2$O)$_2$]$_3$Si—CH$_2$—CH(CH$_3$)—CH$_2$—SH,
[(C$_{12}$H$_{25}$O—(CH$_2$—CH$_2$O)$_3$]$_3$Si—CH$_2$—CH(CH$_3$)—CH$_2$—SH,
[(C$_{12}$H$_{25}$O—(CH$_2$—CH$_2$O)$_4$]$_3$Si—CH$_2$—CH(CH$_3$)—CH$_2$—SH,
[(C$_{12}$H$_{25}$O—(CH$_2$—CH$_2$O)$_5$]$_3$Si—CH$_2$—CH(CH$_3$)—CH$_2$—SH,
[(C$_{12}$H$_{25}$O—(CH$_2$—CH$_2$O)$_6$]$_3$Si—CH$_2$—CH(CH$_3$)—CH$_2$—SH,
[(C$_{13}$H$_{27}$O—(CH$_2$—CH$_2$O)$_2$]$_3$Si—CH$_2$—CH(CH$_3$)—CH$_2$—SH,
[(C$_{13}$H$_{27}$O—(CH$_2$—CH$_2$O)$_3$]$_3$Si—CH$_2$—CH(CH$_3$)—CH$_2$—SH,
[(C$_{13}$H$_{27}$O—(CH$_2$—CH$_2$O)$_4$]$_3$Si—CH$_2$—CH(CH$_3$)—CH$_2$—SH,
[(C$_{13}$H$_{27}$O—(CH$_2$—CH$_2$O)$_5$]$_3$Si—CH$_2$—CH(CH$_3$)—CH$_2$—SH,
[(C$_{13}$H$_{27}$O—(CH$_2$—CH$_2$O)$_6$]$_3$Si—CH$_2$—CH(CH$_3$)—CH$_2$—SH,
[(C$_{14}$H$_{29}$O—(CH$_2$—CH$_2$O)$_2$]$_3$Si—CH$_2$—CH(CH$_3$)—CH$_2$—SH,
[(C$_{14}$H$_{29}$O—(CH$_2$—CH$_2$O)$_3$]$_3$Si—CH$_2$—CH(CH$_3$)—CH$_2$—SH,
[(C$_{14}$H$_{29}$O—(CH$_2$—CH$_2$O)$_4$]$_3$Si—CH$_2$—CH(CH$_3$)—CH$_2$—SH,
[(C$_{14}$H$_{29}$O—(CH$_2$—CH$_2$O)$_5$]$_3$Si—CH$_2$—CH(CH$_3$)—CH$_2$—SH,
[(C$_{14}$H$_{29}$O—(CH$_2$—CH$_2$O)$_6$]$_3$Si—CH$_2$—CH(CH$_3$)—CH$_2$—SH.
[(C$_{15}$H$_{31}$O—(CH$_2$—CH$_2$O)$_2$]$_3$Si—CH$_2$—CH(CH$_3$)—CH$_2$—SH,
[(C$_{15}$H$_{31}$O—(CH$_2$—CH$_2$O)$_3$]$_3$Si—CH$_2$—CH(CH$_3$)—CH$_2$—SH,
[(C$_{15}$H$_{31}$O—(CH$_2$—CH$_2$O)$_4$]$_3$Si—CH$_2$—CH(CH$_3$)—CH$_2$—SH,
[(C$_{15}$H$_{31}$O—(CH$_2$—CH$_2$O)$_5$]$_3$Si—CH$_2$—CH(CH$_3$)—CH$_2$—SH,
[(C$_{15}$H$_{31}$O—(CH$_2$—CH$_2$O)$_6$]$_3$Si—CH$_2$—CH(CH$_3$)—CH$_2$—SH,
[(C$_{16}$H$_{33}$O—(CH$_2$—CH$_2$O)$_2$]$_3$Si—CH$_2$—CH(CH$_3$)—CH$_2$—SH,
[(C$_{16}$H$_{33}$O—(CH$_2$—CH$_2$O)$_3$]$_3$Si—CH$_2$—CH(CH$_3$)—CH$_2$—SH,
[(C$_{16}$H$_{33}$O—(CH$_2$—CH$_2$O)$_4$]$_3$Si—CH$_2$—CH(CH$_3$)—CH$_2$—SH,
[(C$_{16}$H$_{33}$O—(CH$_2$—CH$_2$O)$_5$]$_3$Si—CH$_2$—CH(CH$_3$)—CH$_2$—SH,

[(C$_{16}$H$_{33}$O—(CH$_2$—CH$_2$O)$_6$]$_3$Si—CH$_2$—CH(CH$_3$)—CH$_2$—SH,
[(C$_{17}$H$_{35}$O—(CH$_2$—CH$_2$O)$_2$]$_3$Si—CH$_2$—CH(CH$_3$)—CH$_2$—SH,
[(C$_{17}$H$_{35}$O—(CH$_2$—CH$_2$O)$_3$]$_3$Si—CH$_2$—CH(CH$_3$)—CH$_2$—SH,
[(C$_{17}$H$_{35}$O—(CH$_2$—CH$_2$O)$_4$]$_3$Si—CH$_2$—CH(CH$_3$)—CH$_2$—SH,
[(C$_{17}$H$_{35}$O—(CH$_2$—CH$_2$O)$_5$]$_3$Si—CH$_2$—CH(CH$_3$)—CH$_2$—SH or
[(C$_{17}$H$_{35}$O—(CH$_2$—CH$_2$O)$_6$]$_3$Si—CH$_2$—CH(CH$_3$)—CH$_2$—SH, where R$^6$ can be branched or unbranched.

Preferred compounds of the formula I where R$^4$=CN can be:
[(C$_{11}$H$_{23}$O—(CH$_2$—CH$_2$O)$_2$](EtO)$_2$Si(CH$_2$)$_3$SCN,
[(C$_{11}$H$_{23}$O—(CH$_2$—CH$_2$O)$_3$](EtO)$_2$Si(CH$_2$)$_3$SCN,
[(C$_{11}$H$_{23}$O—(CH$_2$—CH$_2$O)$_4$](EtO)$_2$Si(CH$_2$)$_3$SCN,
[(C$_{11}$H$_{23}$O—(CH$_2$—CH$_2$O)$_5$](EtO)$_2$Si(CH$_2$)$_3$SCN,
[(C$_{11}$H$_{23}$O—(CH$_2$—CH$_2$O)$_6$](EtO)$_2$Si(CH$_2$)$_3$SCN,
[(C$_{12}$H$_{25}$O—(CH$_2$—CH$_2$O)$_2$](EtO)$_2$Si(CH$_2$)$_3$SCN,
[(C$_{12}$H$_{25}$O—(CH$_2$—CH$_2$O)$_3$](EtO)$_2$Si(CH$_2$)$_3$SCN,
[(C$_{12}$H$_{25}$O—(CH$_2$—CH$_2$O)$_4$](EtO)$_2$Si(CH$_2$)$_3$SCN,
[(C$_{12}$H$_{25}$O—(CH$_2$—CH$_2$O)$_5$](EtO)$_2$Si(CH$_2$)$_3$SCN,
[(C$_{12}$H$_{25}$O—(CH$_2$—CH$_2$O)$_6$](EtO)$_2$Si(CH$_2$)$_3$SCN,
[(C$_{13}$H$_{27}$O—(CH$_2$—CH$_2$O)$_2$](EtO)$_2$Si(CH$_2$)$_3$SCN,
[(C$_{13}$H$_{27}$O—(CH$_2$—CH$_2$O)$_3$](EtO)$_2$Si(CH$_2$)$_3$SCN,
[(C$_{13}$H$_{27}$O—(CH$_2$—CH$_2$O)$_4$](EtO)$_2$Si(CH$_2$)$_3$SCN,
[(C$_{13}$H$_{27}$O—(CH$_2$—CH$_2$O)$_5$](EtO)$_2$Si(CH$_2$)$_3$SCN,
[(C$_{13}$H$_{27}$O—(CH$_2$—CH$_2$O)$_6$](EtO)$_2$Si(CH$_2$)$_3$SCN,
[(C$_{14}$H$_{29}$O—(CH$_2$—CH$_2$O)$_2$](EtO)$_2$Si(CH$_2$)$_3$SCN,
[(C$_{14}$H$_{29}$O—(CH$_2$—CH$_2$O)$_3$](EtO)$_2$Si(CH$_2$)$_3$SCN,
[(C$_{14}$H$_{29}$O—(CH$_2$—CH$_2$O)$_4$](EtO)$_2$Si(CH$_2$)$_3$SCN,
[(C$_{14}$H$_{29}$O—(CH$_2$—CH$_2$O)$_5$](EtO)$_2$Si(CH$_2$)$_3$SCN,
[(C$_{14}$H$_{29}$O—(CH$_2$—CH$_2$O)$_6$](EtO)$_2$Si(CH$_2$)$_3$SCN,
[(C$_{11}$H$_{23}$O—(CH$_2$—CH$_2$O)$_2$]$_2$(EtO)Si(CH$_2$)$_3$SCN,
[(C$_{11}$H$_{23}$O—(CH$_2$—CH$_2$O)$_3$]$_2$(EtO)Si(CH$_2$)$_3$SCN,
[(C$_{11}$H$_{23}$O—(CH$_2$—CH$_2$O)$_4$]$_2$(EtO)Si(CH$_2$)$_3$SCN,
[(C$_{11}$H$_{23}$O—(CH$_2$—CH$_2$O)$_5$]$_2$(EtO)Si(CH$_2$)$_3$SCN,
[(C$_{11}$H$_{23}$O—(CH$_2$—CH$_2$O)$_6$]$_2$(EtO)Si(CH$_2$)$_3$SCN,
[(C$_{12}$H$_{25}$O—(CH$_2$—CH$_2$O)$_2$]$_2$(EtO)Si(CH$_2$)$_3$SCN,
[(C$_{12}$H$_{25}$O—(CH$_2$—CH$_2$O)$_3$]$_2$(EtO)Si(CH$_2$)$_3$SCN,
[(C$_{12}$H$_{25}$O—(CH$_2$—CH$_2$O)$_4$]$_2$(EtO)Si(CH$_2$)$_3$SCN,
[(C$_{12}$H$_{25}$O—(CH$_2$—CH$_2$O)$_5$]$_2$(EtO)Si(CH$_2$)$_3$SCN,
[(C$_{12}$H$_{25}$O—(CH$_2$—CH$_2$O)$_6$]$_2$(EtO)Si(CH$_2$)$_3$SCN,
[(C$_{13}$H$_{27}$O—(CH$_2$—CH$_2$O)$_2$]$_2$(EtO)Si(CH$_2$)$_3$SCN,
[(C$_{13}$H$_{27}$O—(CH$_2$—CH$_2$O)$_3$]$_2$(EtO)Si(CH$_2$)$_3$SCN,
[(C$_{13}$H$_{27}$O—(CH$_2$—CH$_2$O)$_4$]$_2$(EtO)Si(CH$_2$)$_3$SCN,
[(C$_{13}$H$_{27}$O—(CH$_2$—CH$_2$O)$_5$]$_2$(EtO)Si(CH$_2$)$_3$SCN,
[(C$_{13}$H$_{27}$O—(CH$_2$—CH$_2$O)$_6$]$_2$(EtO)Si(CH$_2$)$_3$SCN,
[(C$_{14}$H$_{29}$O—(CH$_2$—CH$_2$O)$_2$]$_2$(EtO)Si(CH$_2$)$_3$SCN,
[(C$_{14}$H$_{29}$O—(CH$_2$—CH$_2$O)$_3$]$_2$(EtO)Si(CH$_2$)$_3$SCN,
[(C$_{14}$H$_{29}$O—(CH$_2$—CH$_2$O)$_4$]$_2$(EtO)Si(CH$_2$)$_3$SCN,
[(C$_{14}$H$_{29}$O—(CH$_2$—CH$_2$O)$_5$]$_2$(EtO)Si(CH$_2$)$_3$SCN,
[(C$_{14}$H$_{29}$O—(CH$_2$—CH$_2$O)$_6$]$_2$(EtO)Si(CH$_2$)$_3$SCN,
[(C$_{11}$H$_{23}$O—(CH$_2$—CH$_2$O)$_2$]$_3$Si(CH$_2$)$_3$SCN,
[(C$_{11}$H$_{23}$O—(CH$_2$—CH$_2$O)$_3$]$_3$Si(CH$_2$)$_3$SCN,
[(C$_{11}$H$_{23}$O—(CH$_2$—CH$_2$O)$_4$]$_3$Si(CH$_2$)$_3$SCN,
[(C$_{11}$H$_{23}$O—(CH$_2$—CH$_2$O)$_5$]$_3$Si(CH$_2$)$_3$SCN,
[(C$_{11}$H$_{23}$O—(CH$_2$—CH$_2$O)$_6$]$_3$Si(CH$_2$)$_3$SCN,
[(C$_{12}$H$_{25}$O—(CH$_2$—CH$_2$O)$_2$]$_3$Si(CH$_2$)$_3$SCN,
[(C$_{12}$H$_{25}$O—(CH$_2$—CH$_2$O)$_3$]$_3$Si(CH$_2$)$_3$SCN,
[(C$_{12}$H$_{25}$O—(CH$_2$—CH$_2$O)$_4$]$_3$Si(CH$_2$)$_3$SCN,
[(C$_{12}$H$_{25}$O—(CH$_2$—CH$_2$O)$_5$]$_3$Si(CH$_2$)$_3$SCN,
[(C$_{12}$H$_{25}$O—(CH$_2$—CH$_2$O)$_6$]$_3$Si(CH$_2$)$_3$SCN,
[(C$_{13}$H$_{27}$O—(CH$_2$—CH$_2$O)$_2$]$_3$Si(CH$_2$)$_3$SCN,
[(C$_{13}$H$_{27}$O—(CH$_2$—CH$_2$O)$_3$]$_3$Si(CH$_2$)$_3$SCN,
[(C$_{13}$H$_{27}$O—(CH$_2$—CH$_2$O)$_4$]$_3$Si(CH$_2$)$_3$SCN,
[(C$_{13}$H$_{27}$O—(CH$_2$—CH$_2$O)$_5$]$_3$Si(CH$_2$)$_3$SCN,
[(C$_{13}$H$_{27}$O—(CH$_2$—CH$_2$O)$_6$]$_3$Si(CH$_2$)$_3$SCN,
[(C$_{14}$H$_{29}$O—(CH$_2$—CH$_2$O)$_2$]$_3$Si(CH$_2$)$_3$SCN,
[(C$_{14}$H$_{29}$O—(CH$_2$—CH$_2$O)$_3$]$_3$Si(CH$_2$)$_3$SCN,
[(C$_{14}$H$_{29}$O—(CH$_2$—CH$_2$O)$_4$]$_3$Si(CH$_2$)$_3$SCN,
[(C$_{14}$H$_{29}$O—(CH$_2$—CH$_2$O)$_5$]$_3$Si(CH$_2$)$_3$SCN or
[(C$_{14}$H$_{29}$O—(CH$_2$—CH$_2$O)$_6$]$_3$Si(CH$_2$)$_3$SCN, where R$^6$ can be branched or unbranched.

Preferred compounds of the formula I where R$^4$=—C(=O)—R$^9$ and R$^9$=branched or unbranched —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$, —C$_{15}$H$_{31}$, —C$_{16}$H$_{33}$, —C$_{17}$H$_{35}$ and —C$_6$H$_5$ (phenyl) can be:
[(C$_{11}$H$_{23}$O—(CH$_2$—CH$_2$O)$_2$](EtO)$_2$Si(CH$_2$)$_3$—C(=O)—R$^9$,
[(C$_{11}$H$_{23}$O—(CH$_2$—CH$_2$O)$_3$](EtO)$_2$Si(CH$_2$)$_3$—C(=O)—R$^9$,
[(C$_{11}$H$_{23}$O—(CH$_2$—CH$_2$O)$_4$](EtO)$_2$Si(CH$_2$)$_3$—C(=O)—R$^9$,
[(C$_{11}$H$_{23}$O—(CH$_2$—CH$_2$O)$_5$](EtO)$_2$Si(CH$_2$)$_3$—C(=O)—R$^9$,
[(C$_{11}$H$_{23}$O—(CH$_2$—CH$_2$O)$_6$](EtO)$_2$Si(CH$_2$)$_3$—C(=O)—R$^9$,
[(C$_{12}$H$_{25}$O—(CH$_2$—CH$_2$O)$_2$](EtO)$_2$Si(CH$_2$)$_3$—C(=O)—R$^9$,
[(C$_{12}$H$_{25}$O—(CH$_2$—CH$_2$O)$_3$](EtO)$_2$Si(CH$_2$)$_3$—C(=O)—R$^9$,
[(C$_{12}$H$_{25}$O—(CH$_2$—CH$_2$O)$_4$](EtO)$_2$Si(CH$_2$)$_3$—C(=O)—R$^9$,
[(C$_{12}$H$_{25}$O—(CH$_2$—CH$_2$O)$_5$](EtO)$_2$Si(CH$_2$)$_3$—C(=O)—R$^9$,
[(C$_{12}$H$_{25}$O—(CH$_2$—CH$_2$O)$_6$](EtO)$_2$Si(CH$_2$)$_3$—C(=O)—R$^9$,
[(C$_{13}$H$_{27}$O—(CH$_2$—CH$_2$O)$_2$](EtO)$_2$Si(CH$_2$)$_3$—C(=O)—R$^9$,
[(C$_{13}$H$_{27}$O—(CH$_2$—CH$_2$O)$_3$](EtO)$_2$Si(CH$_2$)$_3$—C(=O)—R$^9$,
[(C$_{13}$H$_{27}$O—(CH$_2$—CH$_2$O)$_4$](EtO)$_2$Si(CH$_2$)$_3$—C(=O)—R$^9$,
[(C$_{13}$H$_{27}$O—(CH$_2$—CH$_2$O)$_5$](EtO)$_2$Si(CH$_2$)$_3$—C(=O)—R$^9$,
[(C$_{13}$H$_{27}$O—(CH$_2$—CH$_2$O)$_6$](EtO)$_2$Si(CH$_2$)$_3$—C(=O)—R$^9$,
[(C$_{14}$H$_{29}$O—(CH$_2$—CH$_2$O)$_2$](EtO)$_2$Si(CH$_2$)$_3$—C(=O)—R$^9$,
[(C$_{14}$H$_{29}$O—(CH$_2$—CH$_2$O)$_3$](EtO)$_2$Si(CH$_2$)$_3$—C(=O)—R$^9$,
[(C$_{14}$H$_{29}$O—(CH$_2$—CH$_2$O)$_4$](EtO)$_2$Si(CH$_2$)$_3$—C(=O)—R$^9$,
[(C$_{14}$H$_{29}$O—(CH$_2$—CH$_2$O)$_5$](EtO)$_2$Si(CH$_2$)$_3$—C(=O)—R$^9$,
[(C$_{14}$H$_{29}$O—(CH$_2$—CH$_2$O)$_6$](EtO)$_2$Si(CH$_2$)$_3$—C(=O)—R$^9$,
[(C$_{11}$H$_{23}$O—(CH$_2$—CH$_2$O)$_2$]$_2$(EtO)Si(CH$_2$)$_3$—C(=O)—R$^9$,
[(C$_{11}$H$_{23}$O—(CH$_2$—CH$_2$O)$_3$]$_2$(EtO)Si(CH$_2$)$_3$—C(=O)—R$^9$,
[(C$_{11}$H$_{23}$O—(CH$_2$—CH$_2$O)$_4$]$_2$(EtO)Si(CH$_2$)$_3$—C(=O)—R$^9$,
[(C$_{11}$H$_{23}$O—(CH$_2$—CH$_2$O)$_5$]$_2$(EtO)Si(CH$_2$)$_3$—C(=O)—R$^9$,
[(C$_{11}$H$_{23}$O—(CH$_2$—CH$_2$O)$_6$]$_2$(EtO)Si(CH$_2$)$_3$—C(=O)—R$^9$,
[(C$_{12}$H$_{25}$O—(CH$_2$—CH$_2$O)$_2$]$_2$(EtO)Si(CH$_2$)$_3$—C(=O)—R$^9$,
[(C$_{12}$H$_{25}$O—(CH$_2$—CH$_2$O)$_3$]$_2$(EtO)Si(CH$_2$)$_3$—C(=O)—R$^9$, $[(C_{12}H_{25}O-(CH_2-CH_2O)_4]_2(EtO)Si(CH_2)_3-C(=O)-R^9$,
$[(C_{12}H_{25}O-(CH_2-CH_2O)_5]_2(EtO)Si(CH_2)_3-C(=O)-R^9$,
$[(C_{12}H_{25}O-(CH_2-CH_2O)_6]_2(EtO)Si(CH_2)_3-C(=O)-R^9$,
$[(C_{13}H_{27}O-(CH_2-CH_2O)_2]_2(EtO)Si(CH_2)_3-C(=O)-R^9$,
$[(C_{13}H_{27}O-(CH_2-CH_2O)_3]_2(EtO)Si(CH_2)_3-C(=O)-R^9$,
$[(C_{13}H_{27}O-(CH_2-CH_2O)_4]_2(EtO)Si(CH_2)_3-C(=O)-R^9$,
$[(C_{13}H_{27}O-(CH_2-CH_2O)_5]_2(EtO)Si(CH_2)_3-C(=O)-R^9$,
$[(C_{13}H_{27}O-(CH_2-CH_2O)_6]_2(EtO)Si(CH_2)_3-C(=O)-R^9$,
$[(C_{14}H_{29}O-(CH_2-CH_2O)_2]_2(EtO)Si(CH_2)_3-C(=O)-R^9$,
$[(C_{14}H_{29}O-(CH_2-CH_2O)_3]_2(EtO)Si(CH_2)_3-C(=O)-R^9$,
$[(C_{14}H_{29}O-(CH_2-CH_2O)_4]_2(EtO)Si(CH_2)_3-C(=O)-R^9$,
$[(C_{14}H_{29}O-(CH_2-CH_2O)_5]_2(EtO)Si(CH_2)_3-C(=O)-R^9$,
$[(C_{14}H_{29}O-(CH_2-CH_2O)_6]_2(EtO)Si(CH_2)_3-C(=O)-R^9$,
$[(C_{11}H_{23}O-(CH_2-CH_2O)_2]_3Si(CH_2)_3-C(=O)-R^9$,
$[(C_{11}H_{23}O-(CH_2-CH_2O)_3]_3Si(CH_2)_3-C(=O)-R^9$,
$[(C_{11}H_{23}O-(CH_2-CH_2O)_4]_3Si(CH_2)_3-C(=O)-R^9$,
$[(C_{11}H_{23}O-(CH_2-CH_2O)_5]_3Si(CH_2)_3-C(=O)-R^9$,
$[(C_{11}H_{23}O-(CH_2-CH_2O)_6]_3Si(CH_2)_3-C(=O)-R^9$,
$[(C_{12}H_{25}O-(CH_2-CH_2O)_2]_3Si(CH_2)_3-C(=O)-R^9$,
$[(C_{12}H_{25}O-(CH_2-CH_2O)_3]_3Si(CH_2)_3-C(=O)-R^9$,
$[(C_{12}H_{25}O-(CH_2-CH_2O)_4]_3Si(CH_2)_3-C(=O)-R^9$,
$[(C_{12}H_{25}O-(CH_2-CH_2O)_5]_3Si(CH_2)_3-C(=O)-R^9$,
$[(C_{12}H_{25}O-(CH_2-CH_2O)_6]_3Si(CH_2)_3-C(=O)-R^9$,
$[(C_{13}H_{27}O-(CH_2-CH_2O)_2]_3Si(CH_2)_3-C(=O)-R^9$,
$[(C_{13}H_{27}O-(CH_2-CH_2O)_3]_3Si(CH_2)_3-C(=O)-R^9$,
$[(C_{13}H_{27}O-(CH_2-CH_2O)_4]_3Si(CH_2)_3-C(=O)-R^9$,
$[(C_{13}H_{27}O-(CH_2-CH_2O)_5]_3Si(CH_2)_3-C(=O)-R^9$,
$[(C_{13}H_{27}O-(CH_2-CH_2O)_6]_3Si(CH_2)_3-C(=O)-R^9$,
$[(C_{14}H_{29}O-(CH_2-CH_2O)_2]_3Si(CH_2)_3-C(=O)-R^9$,
$[(C_{14}H_{29}O-(CH_2-CH_2O)_3]_3Si(CH_2)_3-C(=O)-R^9$,
$[(C_{14}H_{29}O-(CH_2-CH_2O)_4]_3Si(CH_2)_3-C(=O)-R^9$,
$[(C_{14}H_{29}O-(CH_2-CH_2O)_5]_3Si(CH_2)_3-C(=O)-R^9$
or
$[(C_{14}H_{29}O-(CH_2-CH_2O)_6]_3Si(CH_2)_3-C(=O)-R^9$.

$R^6$ can preferably be $C_{12}$ to $C_{17}$, very particularly preferably $C_{12}$ to $C_{16}$, extremely preferably $C_{12}$ to $C_{14}$, unsubstituted or substituted, branched or unbranched monovalent alkyl.

$R^6$ can be a $-C_{11}H_{23}$, $-C_{12}H_{25}$, $-C_{13}H_{27}$, $-C_{14}H_{29}$, $-C_{15}H_{31}$, $-C_{16}H_{33}$ or $-C_{17}H_{35}$ alkyl group.

$R^6$ can preferably be $C_{11}$ to $C_{35}$, particularly preferably $C_{11}$ to $C_{30}$, very particularly preferably $C_{12}$ to $C_{30}$, extremely preferably $C_{13}$ to $C_{20}$, unsubstituted or substituted, branched or unbranched monovalent alkenyl.

$R^6$ can preferably be $C_{11}$ to $C_{14}$ and/or $C_{16}$ to $C_{30}$, very particularly preferably $C_{11}$ to $C_{14}$ and/or $C_{16}$ to $C_{25}$, extremely preferably $C_{12}$ to $C_{14}$ and/or $C_{16}$ to $C_{20}$, unsubstituted or substituted, branched or unbranched monovalent aralkyl.

$R^6$ can, as alkenyl be $C_{11}H_{21}$, $-C_{12}H_{23}$, $-C_{13}H_{25}$, $-C_{14}H_{27}$, $-C_{15}H_{29}$, $-C_{16}H_{31}$ or $-C_{17}H_{33}$.

$R^1$ can be an alkoxylated castor oil (e.g. CAS 61791-12-6).

$R^1$ can be an alkoxylated oleyl amine (e.g. CAS 26635-93-8).

The polyether group $(R^5O)_m$ can comprise random units of ethylene and propylene oxide or polyether blocks made of polyethylene oxide and polypropylene oxide.

The polyether group $(R^5-O)_m$ can preferably be:
$(-O-CH_2-CH_2-)_a$,
$(-O-CH(CH_3)-CH_2-)_a$
$(-O-CH_2-CH(CH_3)-)_a$,
$(-O-CH_2-CH_2-)_a(-O-CH(CH_3)-CH_2-)$,
$(-O-CH_2-CH_2-)(-O-CH(CH_3)-CH_2-)_a$,
$(-O-CH_2-CH_2-)_a(-O-CH_2-CH(CH_3)-)$,
$(-O-CH_2-CH_2-)(-O-CH_2-CH(CH_3)-)_a$,
$(-O-CH(CH_3)-CH_2-)_a(-O-CH_2-CH(CH_3)-)$,
$(-O-CH(CH_3)-CH_2-)(-O-CH_2-CH(CH_3)-)_a$,
$(-O-CH_2-CH_2-)_a(-O-CH(CH_3)-CH_2-)_b(-O-CH_2-CH(CH_3)-)_c$ or a combination of these, where a, b and c are mutually independent and a is from 1 to 50, preferably from 2 to 30, particularly preferably from 3 to 20, very particularly preferably from 4 to 15, extremely preferably from 5 to 12, b is from 1 to 50, preferably from 2 to 30, particularly preferably from 3 to 20, very particularly preferably from 4 to 15, extremely preferably from 5 to 12 and c is from 1 to 50, preferably from 2 to 30, particularly preferably from 3 to 20, very particularly preferably from 4 to 15, extremely preferably from 5 to 12.

The indices a, b and c are integers and denote the number of the repeating units.

When $R^4$ is $-H$, $-CN$ or $-C(=O)-R^9$, the group $(R^5-O)_m$ can preferably comprise ethylene oxide units $(CH_2-CH_2-O)_a$ or propylene oxide units $(CH(CH_3)-CH_2-O)_a$ or $(CH_2-CH(CH_3)-O)_a$.

When $R^4$ is $-H$, $-CN$ or $-C(=O)-R^9$, the group $(R^5-O)_m$ can preferably comprise the following randomly distributed or in blocks: ethylene oxide units $(CH_2-CH_2-O)_a$ or propylene oxide units $(CH(CH_3)-CH_2-O)_a$ or $(CH_2-CH(CH_3)-O)_a$.

When $R^4$ is $-H$, the alkyl polyether group $(R^5-O)_m$ can preferably comprise the following randomly distributed or in blocks: ethylene oxide units $(CH_2-CH_2-O)_a$ or propylene oxide units $(CH(CH_3)-CH_2-O)_a$ or $(CH_2-CH(CH_3)-O)_a$.

When $R^4$ is $-H$, the group $(R^5-O)_m$ can preferably comprise propylene oxide units $(CH(CH_3)-CH_2-O)_a$ or $(CH_2-CH(CH_3)-O)_a$.

When $R^4$ is $-H$, $-CN$ or $-C(C=O)-R^9$, the alkyl polyether group $O-(R^5-O)_m-R^6$ can be:
$O-(CH_2-CH_2O)_2-C_{11}H_{23}$, $O-(CH_2-CH_2O)_3-C_{11}H_{23}$, $O-(CH_2-CH_2O)_4-C_{11}H_{23}$, $O-(CH_2-CH_2O)_5-C_{11}H_{23}$, $O-(CH_2-CH_2O)_6-C_{11}H_{23}$, $O-(CH_2-CH_2O)_7-C_{11}H_{23}$,
$O-(CH(CH_3)-CH_2O)_2-C_{11}H_{23}$, $O-(CH(CH_3)-CH_2O)_3-C_{11}H_{23}$, $O-(CH(CH_3)-CH_2O)_4-C_{11}H_{23}$, $O-(CH(CH_3)-CH_2O)_5-C_{11}H_{23}$, $O-(CH(CH_3)-CH_2O)_6-C_1H_{23}$, $O-(CH(CH_3)-CH_2O)_7-C_{11}H_{23}$,
$O-(CH_2-CH_2O)_2-C_{12}H_{25}$, $O-(CH_2-CH_2O)_3-C_{12}H_{25}$, $O-(CH_2-CH_2O)_4-C_{12}H_{25}$, $O-(CH_2-CH_2O)_5-C_{12}H_{25}$, $O-(CH_2-CH_2O)_6-C_{12}H_{25}$, $O-(CH_2-CH_2O)_7-C_{12}H_{25}$,
$O-(CH(CH_3)-CH_2O)_2-C_{12}H_{25}$, $O-(CH(CH_3)-CH_2O)_3-C_{12}H_{25}$, $O-(CH(CH_3)-CH_2O)_4-C_{12}H_{25}$, $O-(CH(CH_3)-CH_2O)_5-C_{12}H_{25}$, $O-(CH(CH_3)-CH_2O)_6-C_{12}H_{25}$, $O-(CH(CH_3)-CH_2O)_7-C_{12}H_{25}$, O—(CH$_2$—CH$_2$O)$_2$—C$_{13}$H$_{27}$, O—(CH$_2$—CH$_2$O)$_3$—C$_{13}$H$_{27}$, O—(CH$_2$—CH$_2$O)$_4$—C$_{13}$H$_{27}$, O—(CH$_2$—CH$_2$O)$_5$—C$_{13}$H$_{27}$, O—(CH$_2$—CH$_2$O)$_6$—C$_{13}$H$_{27}$, O—(CH$_2$—CH$_2$O)$_7$—C$_{13}$H$_{27}$, O—(CH(CH$_3$)—CH$_2$O)$_2$—C$_{13}$H$_{27}$, O—(CH(CH$_3$)—CH$_2$O)$_3$—C$_{13}$H$_{27}$, O—(CH(CH$_3$)—CH$_2$O)$_4$—C$_{13}$H$_{27}$, O—(CH(CH$_3$)—CH$_2$O)$_5$—C$_3$H$_{27}$, O—(CH(CH$_3$)—CH$_2$O)$_6$—C$_{13}$H$_{27}$, O—(CH(CH$_3$)—CH$_2$O)—C$_{13}$H$_{27}$, O—(CH$_2$—CH$_2$O)$_2$—C$_{14}$H$_{29}$, O—(CH$_2$—CH$_2$O)$_3$—C$_{14}$H$_{29}$, O—(CH$_2$—CH$_2$O)$_4$—C$_{14}$H$_{29}$, O—(CH$_2$—CH$_2$O)$_5$—C$_{14}$H$_{29}$, O—(CH$_2$—CH$_2$O)$_6$—C$_{14}$H$_{29}$, O—(CH$_2$—CH$_2$O)$_7$—C$_{14}$H$_{29}$, O—(CH(CH$_3$)—CH$_2$O)$_2$—C$_{14}$H$_{29}$, O—(CH(CH$_3$)—CH$_2$O)$_3$—C$_{14}$H$_{29}$, O—(CH(CH$_3$)—CH$_2$O)$_4$—C$_{14}$H$_{29}$, O—(CH(CH$_3$)—CH$_2$O)$_5$—C$_4$H$_{29}$, O—(CH(CH$_3$)—CH$_2$O)$_6$—C$_{14}$H$_{29}$, O—(CH(CH$_3$)—H$_2$)$_7$—C$_{14}$H$_{29}$, O—(CH$_2$—CH$_2$O)$_2$—C$_{15}$H$_{31}$, —(CH$_2$—CH$_2$O)$_3$—C$_{15}$H$_{31}$, O—(CH$_2$—CH$_2$O)$_4$—C$_{15}$H$_{31}$, O—(CH$_2$—CH$_2$O)$_5$—C$_{15}$H$_{31}$, O—(CH$_2$—CH$_2$O)$_6$—C$_{15}$H$_{31}$, O—(CH$_2$—CH$_2$O)$_7$—C$_{15}$H$_{31}$, O—(CH(CH$_3$)—CH$_2$O)$_2$—C$_{15}$H$_{31}$, O—(CH(CH$_3$)—CH$_2$O)$_3$—C$_{15}$H$_{31}$, O—(CH(CH$_3$)—CH$_2$O)$_4$—C$_{15}$H$_{31}$, O—(CH(CH$_3$)—CH$_2$O)$_5$—C$_5$H$_{31}$, O—(CH(CH$_3$)—CH$_2$O)$_6$—C$_5$H$_{31}$, O—(CH(CH$_3$)—CH$_2$O)$_7$—C$_{15}$H$_{31}$, O—(CH$_2$—CH$_2$O)$_2$—C$_{16}$H$_{33}$, O—(CH$_2$—CH$_2$O)$_3$—C$_{16}$H$_{33}$, O—(CH$_2$—CH$_2$O)$_4$—C$_{16}$H$_{33}$, O—(CH$_2$—CH$_2$O)$_5$—C$_{16}$H$_{33}$, O—(CH$_2$—CH$_2$O)$_6$—C$_{16}$H$_{33}$, O—(CH$_2$—CH$_2$O)$_7$—C$_{16}$H$_{33}$, O—(CH(CH$_3$)—CH$_2$O)$_2$—C$_{16}$H$_{33}$, O—(CH(CH$_3$)—CHO)$_3$—C$_{16}$H$_{33}$, O—(CH(CH$_3$)—CH$_2$O)$_4$—C$_{16}$H$_{33}$, O—(CH(CH$_3$)—CH$_2$O)$_5$—C$_{16}$H$_{33}$, O—(CH(CH$_3$)—CH$_2$O)$_6$—C$_{16}$H$_{33}$, O—(CH(CH$_3$)—CH$_2$O)$_7$—C$_{16}$H$_{33}$, O—(CH$_2$—CH$_2$O)$_2$—C$_{17}$H$_{35}$, O—(CH$_2$—CH$_2$O)$_3$—C$_{17}$H$_{35}$, O—(CH$_2$—CH$_2$O)$_4$—C$_{17}$H$_{35}$, O—(CH$_2$—CH$_2$O)$_5$—C$_{17}$H$_{35}$, O—(CH$_2$—CH$_2$O)$_6$—C$_{17}$H$_{35}$, O—(CH$_2$—CH$_2$O)$_7$—C$_{17}$H$_{35}$, O—(CH(CH$_3$)—CH$_2$O)$_2$—C$_{17}$H$_{35}$, O—(CH(CH$_3$)—CH$_2$O)$_3$—C$_{17}$H$_{35}$, O—(CH(CH$_3$)—CH$_2$O)$_4$—C$_{17}$H$_{35}$, O—(CH(CH$_3$)—CH$_2$O)$_5$—C$_{17}$H$_{35}$, O—(H(CH$_3$)—CH$_2$O)$_6$—C$_7$H$_3$ or O—(CH(CH$_3$)—CH$_2$O)$_7$—C$_{17}$H$_{35}$.

The group R$^5$ can have substitution. The group R$^6$ can be C$_{13}$H$_{27}$.

R$^1$ can be —O—(C$_2$H$_4$—O)$_5$—C$_{11}$H$_{23}$, —O—(C$_2$H$_4$—O)$_5$—C$_{12}$H$_{25}$, —O—(C$_2$H$_4$—O)$_5$—C$_{13}$H$_{27}$, —O—(C$_2$H$_4$—O)$_5$—C$_{14}$H$_{29}$, —O—(C$_2$H$_4$—O)$_5$—C$_{15}$H$_{31}$, —O—(C$_2$H$_4$—O)$_3$—C$_{13}$H$_{27}$, —O—(C$_2$H$_4$—O)$_4$—C$_{13}$H$_{27}$, —O—(C$_2$H$_4$—O)$_6$—C$_3$H$_{27}$, —O—(C$_2$H$_4$—O)$_7$—C$_{13}$H$_{27}$, —O—(CH$_2$CH$_2$—O)$_5$—(CH$_2$)$_{10}$CH$_3$, —O—(CH$_2$CH$_2$—O)—(CH$_2$)$_{11}$CH$_3$, —O—(CH$_2$CH$_2$—O)—(CH$_2$)$_{12}$CH$_3$, —O—(CH$_2$CH$_2$—O)—(CH$_2$)$_{13}$CH$_3$, —O—(CH$_2$CH$_2$—O)$_5$—(CH$_2$)$_{14}$CH$_3$, —O—(CH$_2$CH$_2$—O)$_3$—(CH$_2$)$_{12}$CH$_3$, —O—(CH$_2$CH$_2$—O)$_4$—(CH$_2$)$_{12}$CH$_3$, —O—(CH$_2$CH$_2$—O)$_6$—(CH$_2$)$_{12}$CH$_3$, —O—(CH$_2$CH$_2$—O)—(CH)$_{12}$CH$_3$,

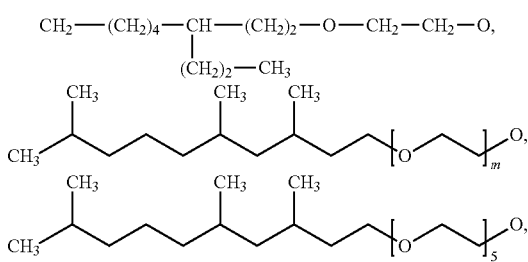

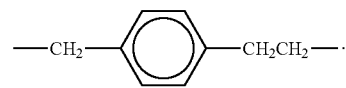

The average branching number of the carbon chain R$^6$ can be from 1 to 5, preferably from 1.2 to 4. The average branching number here is defined as the number of CH$_3$ groups minus 1.

R$^3$ can be CH$_2$, CH$_2$CH$_2$, CH$_2$CH$_2$CH$_2$, CH$_2$CH$_2$CH$_2$CH$_2$, CH(CH$_3$), CH$_2$CH(CH$_3$), CH(CH$_3$)CH$_2$, C(CH$_3$)$_2$, CH(C$_2$H$_5$), CH$_2$CH$_2$CH(CH$_3$), CH$_2$CH(CH$_3$)CH$_2$ or

—CH$_2$—⟨C$_6$H$_4$⟩—CH$_2$CH$_2$—.

The mercaptosilane-polymer blend can comprise a mixture of different mercaptosilanes of the general formula I and optionally of condensates of these.

The mixture of different mercaptosilanes of the general formula I can comprise mercaptosilanes of the general formula I having various m values.

The mixture of different mercaptosilanes of the general formula I can comprise mercaptosilanes of the general formula I having various R$^6$ groups. The R$^6$ groups here can have different C-atom-chain lengths.

The mixture of different mercaptosilanes of the general formula I can comprise different mercaptosilanes of the general formula I having various R$^1$ and R$^2$ groups where the R$^1$ and R$^2$ groups are composed of alkoxy and alkyl polyether groups.

The mixture of different mercaptosilanes of the general formula I can comprise different mercaptosilanes of the general formula I having different R$^2$.

The mixture of different mercaptosilanes of the general formula I can comprise different mercaptosilanes of the general formula I having various R$^1$ and R$^2$ groups where the R$^1$ groups are composed of alkyl polyether groups and the R groups are composed of ethoxy groups and R$^6$ has an alkyl-chain length of 13 C atoms, R$^5$ is ethylene and m is on average 5.

The mixture of different mercaptosilanes of the general formula I can comprise different mercaptosilanes of the general formula I where R$^2$ is identical or different and is an ethoxy or alkyl polyether group (R$^1$), R$^6$ has an alkyl-chain length of 13 C atoms, R$^5$ is ethylene and m is on average 5, and R$^2$ is different.

The mixture of different mercaptosilanes of the general formula I can comprise different mercaptosilanes of the general formula I where R$^1$ and R$^2$ are alkoxy and alkyl polyether groups and R$^6$ is composed of different C-atom-chain lengths.

The mixture of different mercaptosilanes of the general formula I can comprise different mercaptosilanes of the general formula I where R$^2$ is identical or different and is an alkoxy or alkyl polyether group (R$^1$), and R$^2$ in the mixture is different, and R$^6$ is composed of different C-atom-chain lengths.

The mixture of different mercaptosilanes of the general formula I can preferably comprise

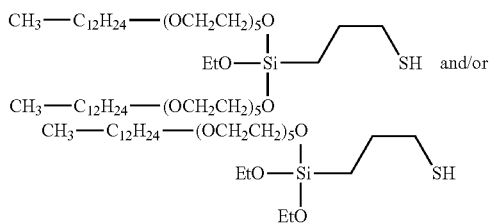

and optionally products of the hydrolysis and/or condensation of the abovementioned compounds.

From the mercaptosilanes of the formula I it is easily possible via water addition and optionally additive addition to form condensates, i.e. oligo- and polysiloxanes.

These oligomeric or polymeric siloxanes of the compounds of the formula I can be used as coupling reagents for the same applications as the monomeric compounds of the formula I.

The mercaptosilane compounds can also take the form of mixture of the oligomeric or polymeric siloxanes of mercaptosilanes of the general formula I or take the form of mixtures of mercaptosilanes of the general formula I with mixtures of the oligomeric or polymeric siloxanes of mercaptosilanes of the general formula I.

The invention further provides a process for the production of the mercaptosilane-polymer blend of the invention, where the process is characterized in that at least one mercaptosilane of the general formula I is mixed with at least one polymer selected from the group of polypropylene, polyethylene, ethylene-vinyl acetate and mixtures of the abovementioned polymers.

The process of the invention can be carried out continuously or batchwise.

The ratio by weight of mercaptosilane of the general formula I to polymer can be from 30:70 to 60:40, preferably from 40:60 to 50:50.

The process of the invention can be carried out at temperatures of from 5 to 150° C., preferably from 10 to 100° C., particularly preferably from 15 to 60° C. In order to avoid condensation reactions, it can be advantageous to carry out the reaction in an anhydrous environment, ideally under inert gas.

The process of the invention can be carried out at atmospheric pressure or at reduced pressure.

The mixing process in the process of the invention can use mechanical mixers. The mechanical mixers can firstly achieve uniform movement and mixing of product and can secondly avoid any excessive destruction of the granulated carrier material.

A parameter frequently used for the classification of solids mixers here is the Froude number (Fr), which gives the ratio of centrifugal acceleration to gravitational acceleration.

It is possible to use not only low-speed mixers where Fr<1, for example tumbling mixers or displacement mixers, but also high-speed mixers where Fr>1, for example impeller mixers, and also centrifugal mixers where Fr>>1.

Examples of a low-speed displacement mixer that can be used are drum mixers (for example from Engelsmann) and twin-shaft mixers (for example from Gericke or Forberg). Examples of high-speed mixers that can be used for the region where Fr>1 are ploughshare mixers (for example from Lödige) and vertical twin-shaft mixers (for example from Amixon). In the region where Fr>>1 it is possible to use centrifugal or intensive mixers (for example from Eirich or Mixaco).

Ploughshare mixers can particularly preferably be used for the process of the invention.

The mercaptosilane-polymer blend of the invention can be used as coupling agent between inorganic materials, for example glass fibres, metals, oxidic fillers, or silicas, and organic polymers, for example thermosets, thermoplastics or elastomers, or as crosslinking agent and surface modifier. The mercaptosilane-polymer blend of the invention can be used as coupling reagent in rubber mixtures, for example tire treads.

The invention further provides a rubber mixture comprising
 (A) at least one rubber,
 (B) at least one filler, preferably precipitated silica, and
 (C) at least one mercaptosilane-polymer blend of the invention.

Rubber used can be natural rubber and/or synthetic rubbers. Preferred synthetic rubbers are described by way of example in W. Hofmann, Kautschuktechnologie [Rubber Technology], Genter Verlag, Stuttgart 1980. They can be inter alia
 polybutadiene (BR),
 polyisoprene (IR),
 styrene/butadiene copolymers, for example emulsion SBR (E-SBR) or solution SBR (S-SBR), preferably having styrene contents of from 1 to 60% by weight, particularly from 5 to 50% by weight (SBR),
 chloroprene (CR)
 isobutylene/isoprene copolymers (IIR),
 butadiene/acrylonitrile copolymers having acrylonitrile contents of from 5 to 60% by weight, preferably from 10 to 50% by weight (NBR),
 partially hydrogenated or fully hydrogenated NBR rubber (HNBR)
 ethylene/propylene/diene copolymers (EPDM)
 abovementioned rubbers which also have functional groups, e.g. carboxy, silanol or epoxy groups, for example epoxidized NR, carboxy-functionalized NBR or silanol (—SiOH)- or siloxy (—Si—OR)-functionalized SBR, or else a mixture of these rubbers.

In a preferred embodiment, the rubbers can be sulphur-vulcanizable. For the production of car tire treads it is in particular possible to use anionically polymerized S-SBR rubbers (solution SBR) with a glass transition temperature above −50° C., and also mixtures of these with diene rubbers. It is particularly preferably possible to use S-SBR rubbers whose butadiene portion has more than 20% by weight vinyl fraction. It is very particularly preferably possible to use S-SBR rubbers whose butadiene portion has more than 50% by weight vinyl fraction.

It is preferably possible to use mixtures of the abovementioned rubbers which have more than 50% by weight, particularly more than 60% by weight, S-SBR content.

The following fillers can be used as fillers for the rubber mixture of the invention:
 Carbon blacks: the carbon blacks to be used here are produced by the lamp-black process, furnace-black process, gas-black process or thermal process and have BET surface areas of from 20 to 200 m$^2$/g. The carbon blacks can optionally also comprise heteroatoms, for example Si.
 Amorphous silicas produced for example by precipitation from solutions of silicates or flame-hydrolysis of silicon halides with specific surface areas of from 5 to 1000 m$^2$/g, preferably from 20 to 400 m$^2$/g (BET surface area) and with primary particle sizes of from to 400 nm. The silicas can optionally also take the form of mixed oxides with other metal oxides, such as Al, Mg, Ca, Ba, Zn and titanium oxides.

Synthetic silicates such as aluminium silicate, alkaline earth metal silicates such as magnesium silicate or calcium silicate, with BET surface areas of from 20 to 400 m²/g and primary particle diameters of from 10 to 400 nm.

Synthetic or natural aluminium oxides and synthetic or natural aluminium hydroxides.

Natural silicates such as kaolin and other naturally occurring silicas.

Glass fibre and glass fibre products (mats, strands) or glass microspheres.

It is preferably possible to use amounts of from 5 to 150 parts by weight, based in each case on 100 parts of rubber, of amorphous silicas produced by precipitation from solutions of silicates, with BET surface areas of from 20 to 400 m²/g, particularly from 100 m²/g to 250 m²/g.

The filler mentioned can be used alone or in a mixture.

The rubber mixture can comprise from 5 to 150 parts by weight of filler (B) and from 0.1 to 35 parts by weight, preferably from 2 to 20 parts by weight, particularly preferably from 5 to 15 parts by weight, of mercaptosilane-polymer blend (C) of the invention, where the parts by weight are based on 100 parts by weight of rubber.

The rubber mixture can also comprise silicone oil and/or alkylsilane.

The rubber mixture of the invention can comprise other known rubber auxiliaries, e.g. crosslinking agents, vulcanization accelerators, reaction accelerators, reaction retarders, antioxidants, stabilizers, processing aids, plasticizers, waxes or metal oxides, and also optionally activators such as triethanolamine, polyethylene glycol or hexanetriol.

The amounts that can be used of the rubber auxiliaries are conventional, depending inter alia on the intended use.

Conventional amounts can by way of example be amounts of from 0.1 to 50% by weight, based on rubber.

Sulphur or organic sulphur donors can be used as crosslinking agents.

The rubber mixture of the invention can comprise other vulcanization accelerators. Examples of suitable vulcanization accelerators that can be used are mercaptobenzothiazoles, sulphenamides, guanidines, dithio-carbamates, thioureas, thiocarbonates, and also zinc salts of these, for example zinc dibutyldithiocarbamate.

The rubber mixture of the invention can preferably also comprise
(D) a thiuram sulphide accelerator and/or carbamate accelerator and/or the corresponding zinc salts,
(E) a nitrogen-containing Co-activator,
(F) optionally other rubber auxiliaries and
(G) optionally other accelerators,
where the ratio by weight of accelerator (D) to nitrogen-containing Co-activator (E) is equal to or greater than 1.

The rubber mixture of the invention can comprise at least 0.25 part by weight, based on 100 parts by weight of rubber, of (D) tetrabenzylthiuram disulphide or tetramethylthiuram disulphide, at most 0.25 part by weight, based on 100 parts by weight of rubber, of (E) diphenylguanidine, and more parts by weight than (D) of (G) cyclohexyl- or dicyclohexylsulphenamide.

It is preferably possible to use sulphenamides together with guanidines and thiurams, particularly cyclohexylsulphenamide or dicylohexylsulphenamide together with diphenylguanidine and tetrabenzylthiuram disulphide or tetramethylthiuram disulphide.

Amounts that can be used of the vulcanization accelerators and sulphur are from 0.1 to 10% by weight, preferably from 0.1 to 5% by weight, based on the rubber used. It is particularly preferably possible to use amounts of from 1 to 4% by weight of sulphur and sulphenamides, amounts of from 0.2 to 1% by weight of thiurams and amounts of from 0% by weight to 0.5% by weight of guanidines.

The invention further provides a process for the production of the rubber mixture of the invention, where said process is characterized in that at least one rubber (A), at least one filler (B), at least one mercaptosilane-polymer blend (C) of the invention and optionally other rubber auxiliaries are mixed in a mixing assembly.

The blending of the rubbers with the filler and optionally rubber auxiliaries and with the mercaptosilane-polymer blend of the invention can be carried out in or on conventional mixing assemblies, such as rolls, internal mixers and mixing extruders. Rubber mixtures of this type can usually be produced in internal mixers, by first incorporating the rubbers, the filler, the mercaptosilane-polymer blend of the invention and the rubber auxiliaries by mixing at from 100 to 170° C., in one or more sequential thermomechanical mixing stages. The addition sequence and the juncture of addition of the individual components here can have a decisive effect on the resultant properties of the mixture. It is usually possible to admix the crosslinking chemicals with the resultant rubber mixture in an internal mixer or on a roll at from 40 to 110° C. and to process the mixture to give what is known as the crude mixture for the subsequent steps of the process, for example shaping and vulcanization.

The rubber mixture of the invention can be vulcanized at temperatures of from 80 to 200° C., preferably from 130 to 180° C., optionally under a pressure of from 10 to 200 bar.

The rubber mixture of the invention can be used for the production of mouldings, for example for the production of pneumatic and other tires, tire treads, cable sheathing, hoses, drive belts, conveyor belts, roll coverings, shoe soles, sealing elements, such as sealing rings and damping elements.

The invention further provides mouldings obtainable from the rubber mixture of the invention by vulcanization.

The mercaptosilane-polymer blends of the invention have the advantage that the mercaptosilane does not undergo any alteration even during a prolonged storage time.

Another advantage is good processability, good reinforcement performance, and good dynamic stiffness and dispersibility.

EXAMPLES

Example 1

The polymer is dried for 8 hours at 26° C. and 80 mbar in a vacuum drying oven. The polymer is then weighed directly into a Somakon MP-L mechanical mixer (Somakon Verfahrenstechnik UG) and mixed at a rotation rate of 250 rpm and room temperature (Table 1), in such a way that the material rises up the outer wall. The scraper is set to a constant rotation rate of 30 rpm. The corresponding silane is applied dropwise by way of a 1.5 mm nozzle to the granulated materials by using a rotary piston pump. The metering rate varies from 7 to 7.5 g/min. The resultant product is post-treated overnight at room temperature in vacuo (50 mbar).

TABLE 1

|  | Blend 1 Comparative ex. | Blend 2 Inventive ex. | Blend 3 Inventive ex. | Blend 4 Inventive ex. |
|---|---|---|---|---|
| Silane | Si 363 | Si 363 | Si 363 | Si 363 |
| Amount of silane | 158 g | 105 g | 158 g | 210 g |
| Polymer | XP-712 (nylon-12) | XP 500 (EVA) | MP-100 (PP) | XP-200 (HDPE) |

TABLE 1-continued

|  | Blend 1 Comparative ex. | Blend 2 Inventive ex. | Blend 3 Inventive ex. | Blend 4 Inventive ex. |
|---|---|---|---|---|
| Amount of polymer | 105 g | 160 g | 104 g | 140 g |
| Mixer rotation rate | 250 rpm | 250 rpm | 250 rpm | 250 rpm |

Accurel XP-712 is a nylon-12 from Membrana GmbH.

Accurel XP-500 is an ethylene-vinyl acetate from Membrana GmbH.

Accurel MP-100 is a polypropylene from Membrana GmbH.

Accurel XP-200 is a HDPE from Membrana GmbH.

Si 363 is an organosilane of the formula $Si(OR)_3(CH_2)_3$—SH, where R=$C_2H_5$ or alkyl polyether from Evonik Industries AG.

Example 2

The formulation used for the rubber mixtures is stated in Table 2 below. The unit phr here means proportions by weight, based on 100 parts of the crude rubber used. The amounts used of the mercaptosilane-polymer blends are isomolar, based on the mercaptosilane. The mixtures are produced at a batch temperature of 155° C. in a 1.5 l mixer (E-type).

The polymer VSL 5025-2 is a solution-polymerized SBR copolymer from Bayer Ag having 25% by weight styrene content and 50% by weight vinyl fraction. The copolymer comprises 37.5 phr of TDAE oil, and has a Mooney viscosity (ML 1+4/100° C.) of 47.

The polymer Buna CB 24 is a cis-1,4-polybutadiene (Neodym type) from Bayer AG having at least 96% cis-1,4 content and a Mooney viscosity of 44±5.

Ultrasil 7000 GR is an easily dispersible silica from Evonik Industries AG with a BET surface area of 170 m²/g.

Vivatec 500 from Klaus Dahleke KG is used as TDAE oil, Vulkanox 4020 is 6PPD from Lanxess Europe GmbH & Co. KG, Vulkanox HS/LG is TMQ from Lanxess and Protektor G3108 is an antiozonant wax from Paramelt B.V., ZnO RS is ZnO from Arnsperger Chemikalien GmbH, EDENOR ST1 GS 2.0 is palmitic-stearic acid from Caldic Deutschland GmbH & Co. KG, and Aktiplast ST is a plasticizer from RheinChemie composed of a blend of hydrocarbons, Zn soaps and fillers. Rhenogran DGG-80 is composed of 80% of DPG on an EVA/EPDM carrier from RheinChemie and Vulkacit CZ is CBS from Lanxess Europe GmbH & Co. KG. Perkacit TBzTD (tetrabenzylthiuram disulphide) is a product of Flexsys N.V.

The rubber mixture is produced in three stages in an internal mixer according to Table 3.

TABLE 3

| Stage 1 | |
|---|---|
| Settings | |
| Mixing assembly | Werner & Pfleiderer GK 1,5E |
| Rotation rate | 80 min⁻¹ |

TABLE 2

| Substance | Amount [phr] of reference rubber mixture I "in situ" | Amount [phr] of reference rubber mixture II, comprising blend 1 | Amount [phr] of rubber mixture I of the invention, comprising blend 2 of the invention | Amount [phr] of rubber mixture II of the invention, comprising blend 3 of the invention | Amount [phr] of rubber mixture III of the invention, comprising blend 4 of the invention |
|---|---|---|---|---|---|
| 1st stage | | | | | |
| Buna VSL 5025-2 | 96 | 96 | 96 | 96 | 96 |
| Buna CB 24 | 30 | 30 | 30 | 30 | 30 |
| Ultrasil 7000 GR | 90 | 90 | 90 | 90 | 90 |
| ZnO RS | 2 | 2 | 2 | 2 | 2 |
| Edenor ST1 | 1 | 1 | 1 | 1 | 1 |
| Vivatec 500 | 8.75 | 8.75 | 8.75 | 8.75 | 8.75 |
| Rhenogran DPG-80 | 2 | 2 | 2 | 2 | 2 |
| Protector G 3108 | 2 | 2 | 2 | 2 | 2 |
| Vulkanox 4020/LG | 2 | 2 | 2 | 2 | 2 |
| Vulkanox HS/LG | 1.5 | 1.5 | 1.5 | 1.5 | 1.5 |
| Aktiplast ST | 3.5 | 3.5 | 3.5 | 3.5 | 3.5 |
| Si 363 | 10 | — | — | — | — |
| Blend 1 | — | 30 | — | — | — |
| Blend 2 | — | — | 30 | — | — |
| Blend 3 | — | — | — | 30 | — |
| Blend 4 | — | — | — | — | 30 |
| 2nd stage | | | | | |
| Stage 1 batch | | | | | |
| 3rd stage | | | | | |
| Stage 2 batch | | | | | |
| Perkacit TBzTD | 0.2 | 0.2 | 0.2 | 0.2 | 0.2 |
| Vulkacit CZ/EG-C | 1.5 | 1.5 | 1.5 | 1.5 | 1.5 |
| Sulphur | 1.5 | 1.5 | 1.5 | 1.5 | 1.5 |

TABLE 3-continued

| | |
|---|---|
| Ram pressure | 5.5 bar |
| Chamber temp. | 80° C. |
| Mixing process | |
| 0 to 0.5 min | Buna VSL 5025-1 + Buna CB 24 |
| 0.5 min | TMQ, 6PPD |
| 0.5 to 1 min | Mixing |
| 1 to 2 min | ½ Ultrasil 7000 GR, silane/silane-polymer blend, ZnO |
| 2 min | Purging and aeration |
| 2 to 3 min | ½ Ultrasil 7000 GR, Protector G3108, stearic acid, Vivatec 500, DPG, plasticizer |
| 3 min | Purging and aeration |
| 3 to 4 min | Mixing and discharge at 150°-160° C. |
| | Stage 2 |
| Settings | |
| Mixing assembly | As in stage 1 except: |
| Rotation rate | 90 min$^{-1}$ |
| Mixing process | |
| 0 to 1 min | Break-up of stage 1 batch |
| 1 to 3 min | Mixing at 155° C. |
| 3 min | Discharge |
| | Stage 3 |
| Settings | |
| Mixing assembly | As in stage 1 except |
| Rotation rate | 40 min$^{-1}$ |
| Chamber temp. | 50° C. |
| Mixing process | |
| 0 to 0.5 min | Stage 2 batch |
| 0.5 to 2 min | Accelerator and sulphur |
| 2 min | Discharge and form milled sheet on laboratory roll mill (Diameter 200 mm, length 450 mm, Roll temperature 50° C.) Homogenization: Form milled sheet for 20 s with roll gap of 3-4 mm, within next 40 s: cut the material and fold it over 3* towards the left and 3* towards the right, and roll the material 3* with narrow roll gap (3 mm) and then withdraw a milled sheet. |
| Batch temp. | <110° C. |

The general process for the production of rubber mixtures and vulcanisates of these is described in "Rubber Technology Handbook", W. Hofmann, Hanser Verlag 1994.

Technical testing takes place according to the test methods stated in Table 4.

TABLE 4

| Physical testing | Standard/conditions |
|---|---|
| ML 1 + 4, 100° C. (3$^{rd}$ stage) | DIN 53523/3, ISO 667 |
| Ring tensile test, 23° C. | DIN 53504, ISO 37 |
| Tensile stress values | |
| Dispersion coefficient (topography) | See "Determination of dispersion coefficient" |
| Viscoelastic properties, 0 and 60° C., 16 Hz, initial force 50 N and amplitude force 25 N Complexer module E* (MPa) | DIN 53 513, ISO 2856 |

Determination of Dispersion Coefficient

The dispersion coefficient can be determined by a topographic method described in: "Entwicklung eines Verfahrens zur Charakterisierung der Füllstoffdispersion in Gummimischungen mittels einer Oberflächentopographie [Development of a surface-topography method for characterizing filler dispersion in vulcanized rubber mixtures]" A. Wehmeier; Degree thesis 1998 at the Münster University of Applied Sciences, Steinfurt site, in Chemical Engineering Department and "Filler dispersion Analysis by Topography Measurements" Degussa AG, Applied Technology Advanced Fillers, Technical Report TR 820.

The dispersion coefficient can also alternatively be determined by means of the DIAS method (optically) at the Deutsches Institut für Kautschuktechnologie in Hanover (see H. Geisler, DIK aktuell, 1$^{st}$ Edition (1997) and Medalia, Rubber Age, April 1965).

The best achievable degree of dispersion is 100%, and accordingly the theoretically poorest would be 0%. Silicas with a dispersion coefficient above or equal to 90% can be classified as having high dispersibility (HD).

Explanation of the determination of dispersion coefficient by means of surface topography:

$$\text{Dispersion coefficient} = 100\% - \frac{(\text{Total areas underlying peaks}) \cdot 10000\% \cdot \text{Medalia factor}}{\text{Filler volume} \cdot (\text{total area tested})}\%$$

$$\text{Medalia factor} = \frac{\frac{\text{Filler volume}}{100\%} + 0.78}{2}$$

dispersion coefficient in %
total areas underlying peaks (measure of roughness) in mm$^2$
filler volume in %
total area tested in mm$^2$ Table 5 states the technical data for crude mixture and vulcanisate.

TABLE 5

| | Reference rubber mixture I "in situ" | Reference rubber mixture II, comprising blend 1 | Rubber mixture I of the invention, comprising blend 2 of the invention | Rubber mixture II of the invention, comprising blend 3 of the invention | Rubber mixture III of the invention, comprising blend 4 of the invention |
|---|---|---|---|---|---|
| Results from crude mixture | | | | | |
| ML(1 + 4) at 100° C., 1$^{st}$ stage [MU] | 114 | 129 | 102 | 96 | 107 |
| Results from vulcanisate | | | | | |
| 100% Modulus [MPa] | 2.1 | 2.3 | 2.6 | 3.0 | 2.8 |

TABLE 5-continued

|  | Reference rubber mixture I "in situ" | Reference rubber mixture II, comprising blend 1 | Rubber mixture I of the invention, comprising blend 2 of the invention | Rubber mixture II of the invention, comprising blend 3 of the invention | Rubber mixture III of the invention, comprising blend 4 of the invention |
|---|---|---|---|---|---|
| 300% Modulus [MPa] | 11.9 | not measurable | 12.5 | 13.3 | 12.8 |
| MTS, 16 Hz, initial force 50 N, amplitude force 25 N, 0° C. [MPa] | 14.8 | 14.0 | 20.1 | 33.5 | 30.8 |
| MTS, 16 Hz, initial force 50 N, amplitude force 25 N, 60° C. [MPa] | 7.5 | 7.9 | 9.1 | 10.9 | 11.3 |
| Dispersion (topography) [%] | 1.5 | 7.0 | 1.0 | 2.0 | 1.7 |

In comparison with the isomolar in-situ mixture or mercaptosilane-polymer blend with polyamide, the rubber mixtures comprising the mercaptosilane-polymer blends of the invention exhibit improved processing performance (lower Mooney viscosities in the 1st mixing stage), improved reinforcement performance (higher moduli), improved dynamic stiffness and excellent dispersion.

The invention claimed is:

1. A mercaptosilane-polymer blend, comprising at least one mercaptosilane of formula I:

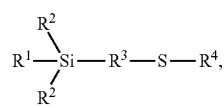

wherein

R$^1$ is an alkyl polyether group —O—(R$^5$—O)$_m$—R$^6$, where R$^5$ is identical or different and is a branched or unbranched, saturated or unsaturated, aliphatic divalent C1-C30 hydrocarbon group, m is on average from 1 to 30, and R$^6$ comprises at least 1 C atom and is an unsubstituted or substituted, branched or unbranched monovalent alkyl, alkenyl, aryl or aralkyl group, R$^2$ is identical or different and is an R1, C1-C12-alkyl or R$^7$O group, where R$^7$ is H, methyl, ethyl, propyl, C9-C30 branched or unbranched monovalent alkyl, alkenyl, aryl, or aralkyl group or (R$^8$)$_3$Si group, where R$^8$ is C1-C30 branched or unbranched alkyl or alkenyl group, R$^3$ is a branched or unbranched, saturated or unsaturated, aliphatic, aromatic or mixed aliphatic/aromatic divalent C1-C30 hydrocarbon group, and R$^4$ is H, CN or (C=O)—R$^9$, where R$^9$ is a branched or unbranched, saturated or unsaturated, aliphatic, aromatic or mixed aliphatic/aromatic monovalent C1-C30 hydrocarbon group; and at least one polymer selected from the group consisting of polypropylene, polyethylene, and mixtures thereof.

2. The mercaptosilane-polymer blend of claim 1, comprising a mixture of mercaptosilanes of the formula I.

3. The mercaptosilane-polymer blend of claim 2, wherein the mixture of mercaptosilanes of the formula (I) comprises

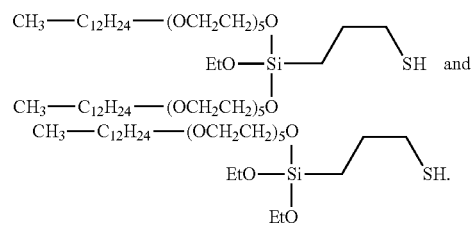

4. The mercaptosilane-polymer blend of claim 1, wherein the at least one mercaptosilane of formula I further comprises products of the hydrolysis and/or condensation of the mercaptosilanes of formula I.

5. The mercaptosilane-polymer blend of claim 1, wherein a molar mass of the polymer is from 50 000-1 000 000 g/mol.

6. A process for producing the mercaptosilane-polymer blend of claim 1, the process comprising mixing the at least one mercaptosilane of formula I with the at least one polymer selected from the group consisting of polypropylene, polyethylene, and mixtures thereof.

7. The process of claim 6, wherein the mixing occurs with a ploughshare mixer.

8. A rubber mixture, comprising the mercaptosilane-polymer blend of claim 1.

9. A rubber mixture, comprising
(A) at least one rubber,
(B) at least one filler, and
(C) the at least one mercaptosilane-polymer blend of claim 1.

10. A process for producing the rubber mixture of claim 9, the process comprising mixing the at least one rubber, the at least one filler, the at least one mercaptosilane-polymer blend, and optionally at least one other rubber auxiliary in a mixing assembly.

11. A moulding produced from the mercaptosilane-polymer blend of claim 1.

12. An article produced from the mercaptosilane-polymer blend of claim 1, the article selected from the group consisting of a tire, a tire tread, a cable sheathing, a hose, a drive belt, a conveyor belt, a roll covering, a shoe sole, a sealing ring, and a damping element.

13. The rubber mixture of claim 8, wherein the mercaptosilane-polymer blend comprises polypropylene.

14. The rubber mixture of claim 8, wherein the mercaptosilane-polymer blend comprises polyethylene.

15. The rubber mixture of claim 13, wherein the mixture of mercaptosilanes of formula (I) in the mercaptosilane-polymer blend comprises:
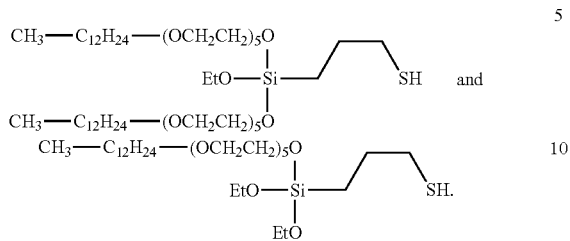
and
16. The rubber mixture of claim 14, wherein the mixture of mercaptosilanes of formula (I) in the mercaptosilane-polymer blend comprises:
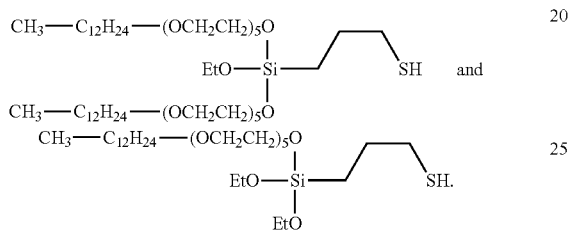
and
* * * * *